United States Patent
Hirai

(10) Patent No.: US 8,811,501 B2
(45) Date of Patent: Aug. 19, 2014

(54) RECEIVING APPARATUS, TRANSMISSION AND RECEPTION SYSTEM, AND RESTORATION METHOD

(71) Applicant: Fujitsu Limited, Kawasaki (JP)

(72) Inventor: Haruka Hirai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 81 days.

(21) Appl. No.: 13/661,139

(22) Filed: Oct. 26, 2012

(65) Prior Publication Data

US 2013/0170567 A1  Jul. 4, 2013

(30) Foreign Application Priority Data

Dec. 28, 2011 (JP) ................................. 2011-290188

(51) Int. Cl.
   *H04L 27/00*  (2006.01)
(52) U.S. Cl.
   USPC ........................................................ 375/259
(58) Field of Classification Search
   USPC ........................................................ 375/259
   See application file for complete search history.

(56) References Cited

U.S. PATENT DOCUMENTS

| 5,742,194 A * | 4/1998 | Saeki ............................. 327/298 |
| 7,254,201 B2 | 8/2007 | Kim |
| 8,482,332 B2 * | 7/2013 | Peng et al. ..................... 327/291 |

FOREIGN PATENT DOCUMENTS

JP  2004-80792  3/2004

OTHER PUBLICATIONS

Nick Sawyer, "Data Recovery," XILINX, XAPP224 (v2.2) Aug. 7, 2002; pp. 1-6 with English translation.

* cited by examiner

*Primary Examiner* — Shuwang Liu
*Assistant Examiner* — Nader Bolourchi
(74) *Attorney, Agent, or Firm* — Fujitsu Patent Center

(57) ABSTRACT

A receiving apparatus, based on received data and previous selection signals corresponding to the received data, selects transfer data from among the received data. A restoration timing is assumed to change from timing D to timing C, whereby the receiving apparatus, when the transition direction of the restoration timing is a reverse direction to the angle advancement direction and a time period of the restoration timing change exceeds a generation cycle of plural timings, produces all valid information of the transfer data as true values. In addition to data at the restoration timings, data that are received after the restoration timing when the generation cycle is judged to be exceeded and that are received at timings that, according to the order of generation, do not exceed the generation cycle, are also restored.

7 Claims, 20 Drawing Sheets

FIG.10

| DVALID[0] | DVALID[1] | RESTORED DATA |
|---|---|---|
| 0 | 0 | NONE |
| 1 | 0 | SDATA[0] |
| 1 | 1 | SDATA[0], SDATA[1] |

RECEIVING APPARATUS, TRANSMISSION AND RECEPTION SYSTEM, AND RESTORATION METHOD

CROSS REFERENCE TO RELATED APPLICATIONS

This application is based upon and claims the benefit of priority of the prior Japanese Patent Application No. 2011-290188, filed on Dec. 28, 2011, the entire contents of which are incorporated herein by reference.

FIELD

The embodiment discussed herein is related to a receiving apparatus, a transmission and reception system, and a restoration method.

BACKGROUND

When a receiving apparatus receives serial data that is a data string transmitted by a transmitting apparatus, because the clock frequencies of the receiving apparatus and the transmitting apparatus are different from each other, a case is conventionally present where the data cannot to be received or where the data cannot be accurately received because the same data is received multiple times. A technique is known of restoring the data for the receiving apparatus to accurately receive the data transmitted by the transmitting apparatus.

For example, related to the technique above, another technique is known where a receiving apparatus receives a data string based on multiple timings produced from a clock; dynamically determines a restoration timing to restore the data received at the timings; and, in this determination, when consecutive changes of the restoration timing exceed one cycle of the clock supplied to the receiving apparatus, the receiving apparatus adds data to be restored or deletes data from a data group to be restored (see, e.g., Nick Sawyer, "Restoration of Data", Xilinx, XAPP244 (v2.2), Aug. 7, 2002, pp. 1-6.

Another related technique is known where a receiving apparatus generates a clock synchronized with a data string transmitted by a transmitting apparatus, whereby, data is restored (see, e.g., Japanese Laid-Open Patent Publication No. 2004-80792).

However, in the case where the receiving apparatus dynamically determines the timing to restore the data received, when the data transmitted from the transmitting apparatus changes at a low frequency, the restoration timing changes discretely. Therefore, the data to be restored is still lost or the same data is still restored multiple times. As a result, a problem arises in that the accuracy in restoring the data is degraded.

SUMMARY

According to an aspect of an embodiment, a receiving apparatus connected to a transmission apparatus that transmits data, includes a clock generating unit that generates a clock signal at a predetermined frequency; a clock angle-advancing unit that generates a plurality of angle-advanced clock signals including the clock signal generated by the clock generating unit and a plurality of clock signals corresponding to a plurality of timings and generated by angle-advancing the clock signal by predetermined phases; a receiving unit that uses the angle-advanced clock signals to receive at the timings, the data transmitted by the transmitting apparatus; a detecting unit that detects each rising edge of each of the received data received by the receiving unit, and each falling edge of each of the received data received by the receiving unit; a determining unit that based on the detected rising edge of each of the received data and the detected falling edge of the received data, produces a plurality of selection signals that each determine, among the timings, a restoration timing to restore the data, and a plurality of previous selection signals retaining the selection signals; a judging unit that judges a transition direction of the restoration timing among the timings, based on the selection signals and the previous selection signals; a selecting unit that selects transfer data from among the received data, based on the received data and the previous selection signals corresponding to the received data; and a valid information producing unit that produces valid information of the transfer data selected by the selecting unit, based on the selection signals, the previous selection signals, and the transition direction judged by the judging unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is an explanatory diagram of a method of selecting a signal SDATA using a signal DVALID;

DESCRIPTION OF EMBODIMENTS

Preferred embodiments of the present invention will be explained with reference to the accompanying drawings.

For facilitation of understanding, restoration of data will be described prior to detailed description of an embodiment of a receiving apparatus, a transmission and reception system, and a restoration method according the present invention. "Restoration of data" is an approach for a receiving apparatus to which a clock ("reception CLK" or "CLK2") is supplied that is different from a clock supplied to a transmitting apparatus ("transmission CLK" or "CLK1") to accurately receive serial data transmitted from the transmitting apparatus. The receiving apparatus dynamically determines the timing to restore the serial data received from the transmitting apparatus.

In the embodiment, for example, data determined to be restored is such data as that received by the receiving apparatus at any timing among timings acquired by dividing one cycle of the signal CLK2 into, for example, four. A timing of the rising edge of the signal CLK2 is denoted by "timing A" and a timing of the rising edge of a clock whose phase is shifted by 90 degrees against that of the rising edge of the signal CLK2 is denoted by "timing B". A timing of the falling edge of the signal CLK2 is denoted by "timing C" and a timing of the falling edge of the clock whose phase is shifted by 90 degrees with respect to that of the falling edge of the signal CLK2 is denoted by "timing D". Therefore, the generation cycle of each of the timings A to D is equal to one cycle of the signal CLK2.

Figure 1:
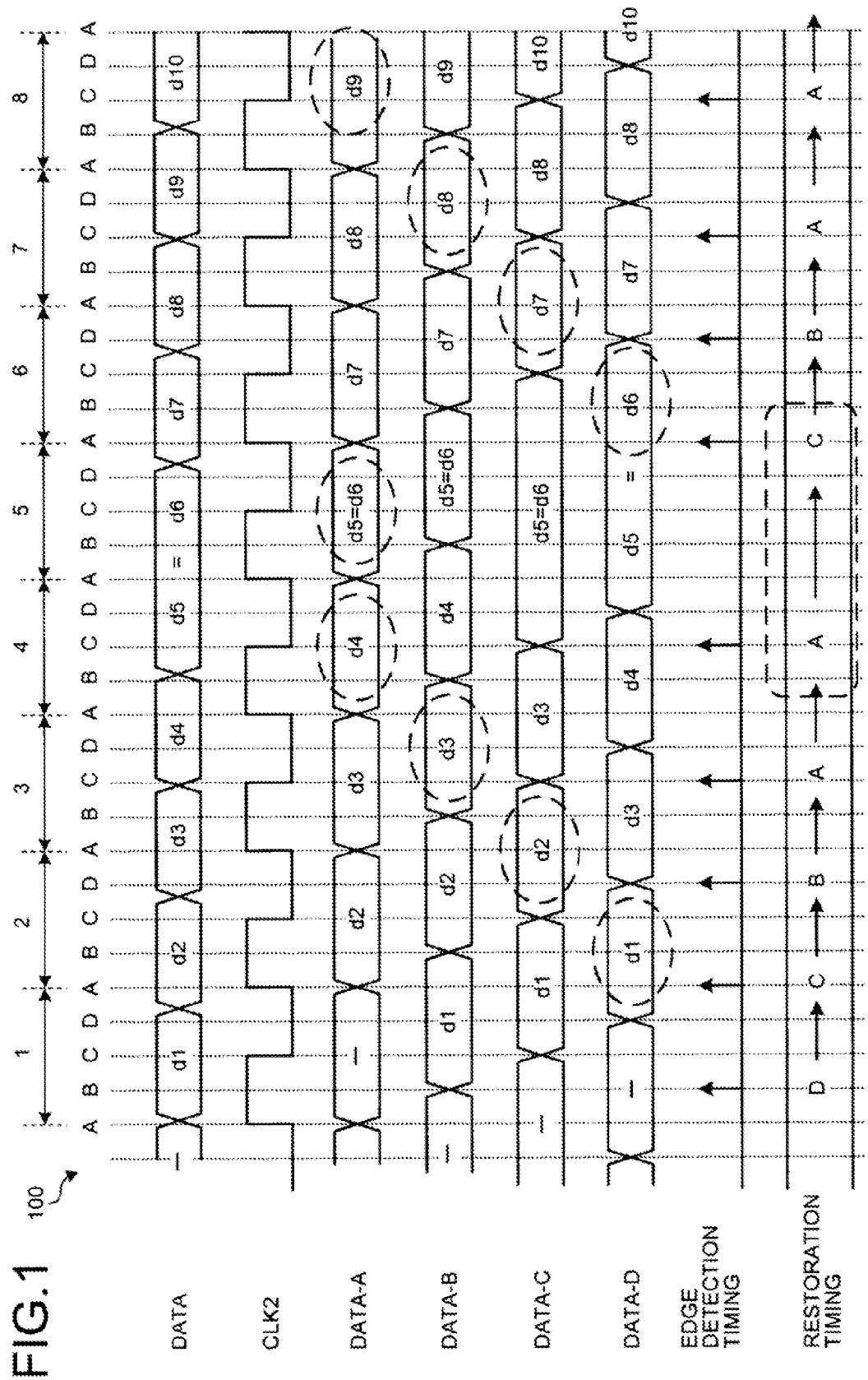
FIG. 1 is an explanatory diagram of a first example of restoration of data by a receiving apparatus according to the present invention.

FIG. 1 is an explanatory diagram of a first example of restoration of data by the receiving apparatus according to the present invention. A timing chart 100 indicates signals DATA, DATA-A, DATA-B, DATA-C, and DATA-D. The signal DATA represents a data string transmitted from the transmitting apparatus. Data d1 to d10 represent data items included in the data string. The signal DATA-A represents data received at the timing A. The signal DATA-B represents data received at the timing B. The signal DATA-C represents data received at the timing C. The signal DATA-D represents data received at the timing D. For facilitation of understanding, "data d1" to "data d10" are used to represent data. However, the receiving apparatus simply receives the value of the signal DATA at each of the timings without determining which of the data D1 to D10 the received data is.

The timing chart 100 further presents edge detection timings and restoration timings. An "edge detection timing" is a timing at which a change of the value of the signal DATA occurs. For example, because the value of the data d1 and that of the data d2 are different from each other, a change at the rising edge or the falling edge occurs with respect to the value of the signal DATA. A change from the data d1 to the data d2 occurs between the timings D and A and therefore, the edge detection timing is the timing A. The edge detection timing is indicated by an arrow pointing upward. The "restoration timing" is a timing selected from multiple timings and the data received at the restoration timing is the data to be restored. In the timing chart 100, each received data encompassed by a circle is the data received at the restoration timing and is the data to be restored.

The receiving apparatus receives data transmitted by the transmitting apparatus at multiple timings. The timings are the timings A to D. The receiving apparatus detects the edge detection timing from the timings based on the data received at the timings. The method used of detecting the edge detection timing may be same as the conventional method and therefore, detailed description thereof will be made later with reference to FIGS. 3 to 12, 19, and 20.

The receiving apparatus determines the restoration timing from the timings based on the edge detection timing. For example, the receiving apparatus produces multiple selection signals to determine the restoration timing and multiple previous selection signals retaining the selection signals. The method used of determining the restoration timing may be same as the conventional method and therefore, detailed description thereof will be made later with reference to FIGS. 3 to 12, 19, and 20.

The receiving apparatus selects transfer data from among the received data based on the received data and the previous selection signals corresponding to the received data.

The receiving apparatus judges the transition direction of the restoration timing in the timings based on the selection signals and the previous selection signal. For example, when the changes of the restoration timing are consecutive, the receiving apparatus is able to judge the transition direction of the restoration timing.

For example, the receiving apparatus detects the change of the restoration timing from the timing A to the timing B and thereby, judges that the transition direction of the restoration timing is a forward direction to an angle advancement direction along which the phase of the reception CLK advances. The change of the restoration timing from the timing A to the timing B is detected when, among the selection signals, the timing is the timing A, which is indicated by a selection signal that is enable and among the previous selection signals, the timing is the timing B, which is indicated by a previous selection signal that is enabled. The order that is from the timing A to the timing D (A to B to C to D to A . . . ) and that is the order of phase advancement of the reception CLK is referred to as "order of generation of the timings". Therefore, the forward direction to the angle advancement direction is the direction that follows the order of generation of the timings like "from the timing A to the timing B, from the timing B to the timing C, from the timing C to the timing D, and from the timing D to the timing A".

For example, the receiving apparatus detects the change of the restoration timing from the timing B to the timing A and thereby, judges that the transition direction of the restoration timing is a reverse direction to the angle advancement direction. The reverse direction to the angle advancement direction is the direction that does not follow the order of generation of the timings, like "from the timing A to the timing D, from the timing D to the timing C, from the timing C to the timing B, and from the timing B to the timing A".

For example, when the change of the restoration timing follows the order of the generation, the frequency of the signal CLK2 is higher than that of the signal CLK1. For example, when the change of the restoration timing does not follow the order of the generation, the frequency of the signal CLK1 is higher than that of the signal CLK2.

In the example depicted FIG. 1, the restoration timing changes from the timing D to the timing C and therefore, the receiving apparatus judges that the transition direction of the restoration timing is the reverse direction to the angle advancement direction.

In a case where the transition direction of the restoration timing is the reverse direction to the angle advancement direction, when the restoration timing changes from the timing A to the timing C, the receiving apparatus judges that the time period of the change of the restoration timing exceeds the generation cycle of the timings. In FIG. 1, a portion encompassed by a dotted-line square represents the change of the restoration timing from the timing A to the timing C.

The receiving apparatus produces valid information of the transfer data based on the selection signals, the previous selection signals, and the transition direction of the restoration timing. In the example depicted in FIG. 1, when the transition direction of the restoration timing is the reverse direction to the angle advancement direction and the time period of the change of the restoration timing exceeds the generation cycle of the timings, the receiving apparatus produces all of the valid information of the transfer data as true values.

In FIG. 1, the data to be restored are those each encompassed by a circle. In addition to the data d1 to d5 and d7 to d9, the data d6 is the data to be restored that is received at a timing not exceeding the generation cycle following the order of generation from the restoration timing for a case where the generation cycle is exceeded.

Although not depicted in FIG. 1, in a case where the order of generation is not followed, when the restoration timing is changed from the timing B to the timing D, the receiving apparatus judges that the time period of the change of the restoration timing exceeds the generation cycle of the timings. Otherwise, though not depicted in FIG. 1, when the restoration timing is changed from the timing A to the timing D, the receiving apparatus judges that the time period of the change of the restoration timing exceeds the generation cycle of the timings.

Data of the data group received at the restoration timing are the data d1 of the signal DATA-D, the data d2 of the signal DATA-C, the data d3 of the signal DATA-B, the data d4 of the signal DATA-A, and the data d5 of the signal DATA-A. Data of the data group received at the restoration timing are the data d7 of the signal DATA-C, the data d8 of the DATA-B, and the data d9 of the signal DATA-A. As described, it is judged that the change from the timing A to the timing C exceeds the generation cycle among the timings and therefore, the data received at the timings not exceeding the generation cycle following the order of generation from the timing A can be the data d6 (=the data d5) of the signal DATA-D and the data d6 (=the data d5) of the signal DATA-C. In this case, the possibility becomes higher of being the data next to the data received at the timing A and therefore, the data is the data to be restored, that is received at the timing C or D that is away from the timing A by about two timings following the order of generation.

According to the example depicted in FIG. 1, loss of the restored data is able to be prevented. Therefore, the restoration accuracy is able to be improved.

Figure 2:
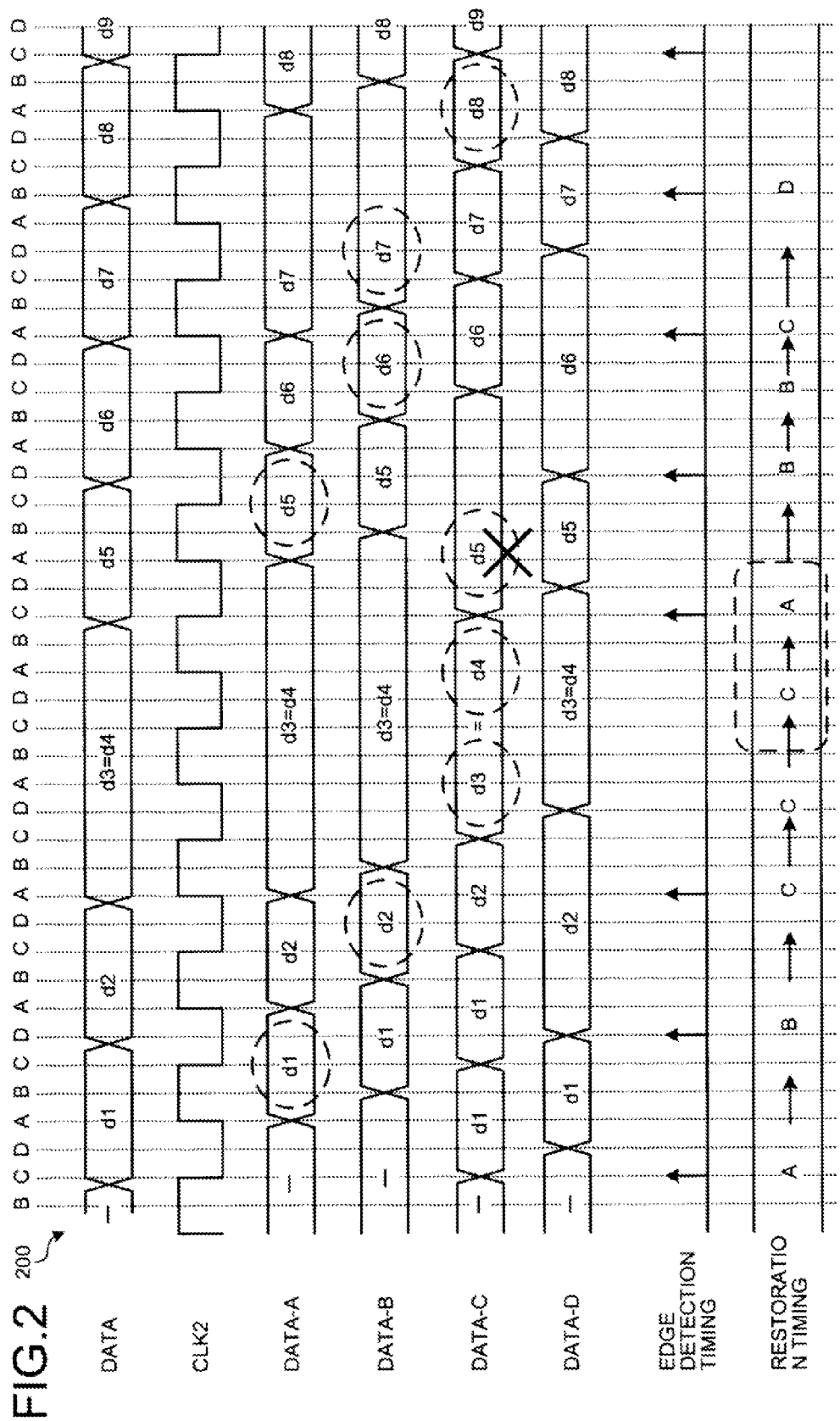
FIG. 2 is an explanatory diagram of a second example of restoration of data by the receiving apparatus according to the present invention.

FIG. 2 is an explanatory diagram of a second example of restoration of data by the receiving apparatus according to the present invention. Similarly to the timing chart 100, a timing chart 200 indicates the signals DATA, DATA-A, DATA-B, DATA-C, DATA D, the edge detection timing, and the restoration timing.

In the example of FIG. 2, the restoration timing changes from the timing A to the timing B and therefore, the receiving apparatus judges that the transition direction of the restoration timing is the forward direction to the angle advancement direction.

In a case where the transition direction of the restoration timing is the forward direction to the angle advancement direction, when the restoration timing is changed from the timing C to the timing A, the receiving apparatus judges that the time period of the change of the restoration timing exceeds the generation cycle of the timings. In FIG. 2, a portion encompassed by a dotted-line square represents the change of the restoration timing from the timing C to the timing A.

The receiving apparatus produces valid information of the transfer data based on the selection signals, the previous selection signals, the transition direction of the restoration timing. In the example depicted in FIG. 2, when the transition direction of the restoration timing is the forward direction to the angle advancement direction and the time period of the change of the restoration timing exceeds the generation cycle of the timings, the receiving apparatus produces all of the valid information of the transfer data as false values.

In FIG. 2, the data to be restored are those each encompassed by a circle. Excluded from the data at the restoration timing is data that is to be restored at the restoration timing of either the restoration timing before or after the change when the time period of the change of the restoration timing exceeds the generation cycle of the timings.

The data group received at the restoration timings includes the data d1 of the signal DATA-A, the data d2 of the signal DATA-B, the data d3 of the signal DATA-C, and the data d4 of the signal DATA-C. The data received at the restoration timings are the data d5 of the signal DATA-C, the data d5 of the signal DATA-A, the data d6 of the signal DATA-B, the data d7 of the signal DATA-B, and the data d8 of the signal DATA-C. The data received at a first restoration timing is the data d5 of the signal DATA-C and the data received at a second restoration timing is the data d5 of the signal DATA-A and therefore, the data d5 is to be doubly restored. Therefore, in the example of FIG. 2, the receiving apparatus determines that the data group to be restored is the data group remaining after excluding the data d5 of the signal DATA-C from the data group received at the restoration timings.

According to the example of FIG. 2, double restoration of the same data is able to be prevented. Therefore, the restoration accuracy is able to be improved.

Figure 3:
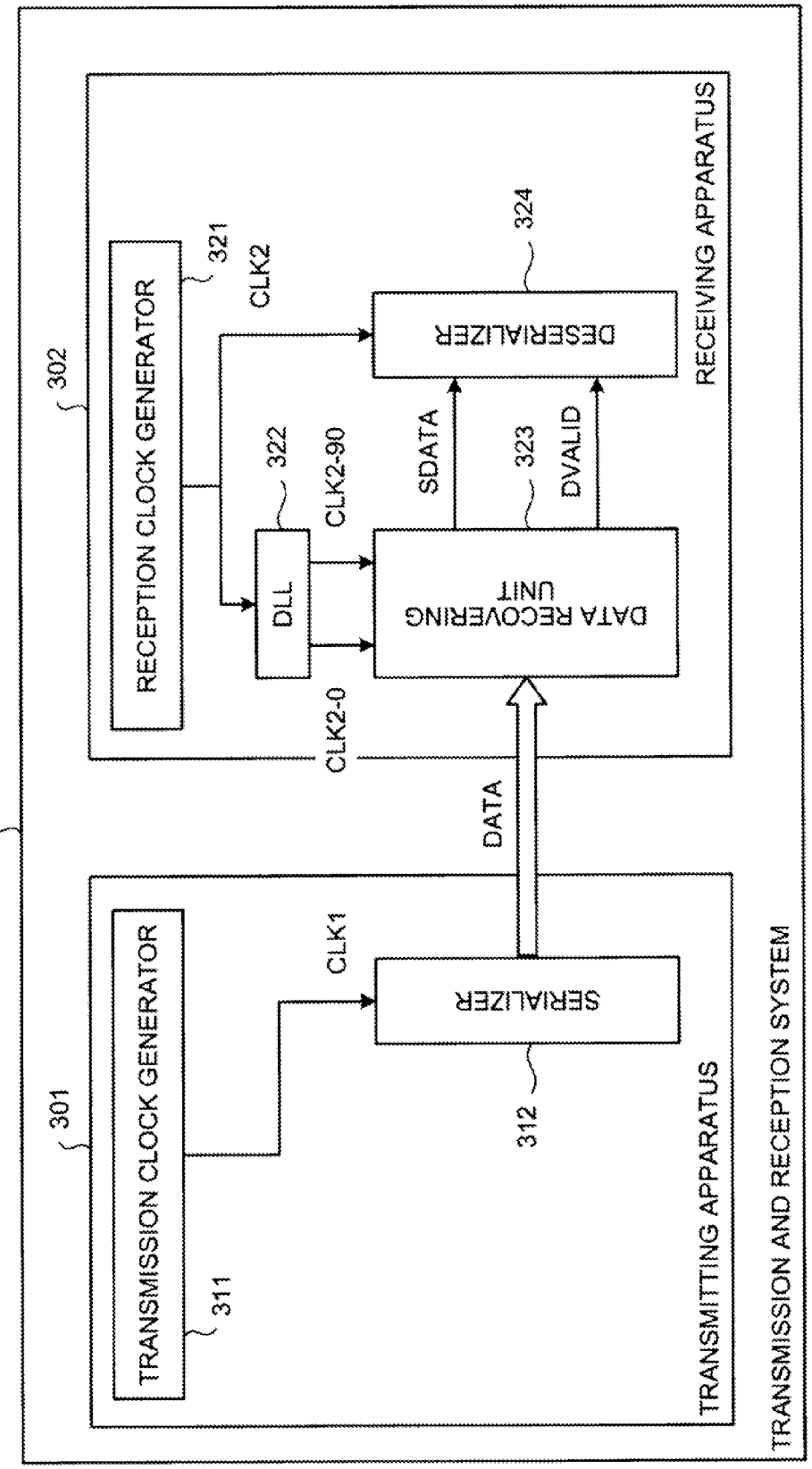
FIG. 3 is an explanatory diagram of an example of a transmission and reception system.

FIG. 3 is an explanatory diagram of an example of a transmission and reception system. The transmission and reception system 300 includes a transmitting apparatus 301 and a receiving apparatus 302. The transmitting apparatus 301 includes a transmission clock generator 311 and a serializer 312.

The transmission clock generator 311 is a clock generating circuit such as a PLL (Phase Locked Loop) circuit that supplies the signal CLK1 to the serializer 312. The serializer 312 is a transmitting unit that transmits to the receiving apparatus 302 the signal DATA that is converted from parallel data to serial data in response to the rising edge of the signal CLK1.

The receiving apparatus 302 includes a reception clock generator 321, a DLL (Delay Locked Loop) 322, a data recovering unit 323, and a deserializer 324.

The reception clock generator 321 is a clock generating unit that generates a clock signal at a predetermined frequency. For example, the reception clock generator 321 is a clock generating circuit such as a clock generating PLL circuit that supplies the signal CLK2 to the DLL 322 and the deserializer 324.

The DLL 322 is a clock angle-advancing unit generating multiple angle-advancement clock signals that include the signal CLK2 generated by the reception clock generator 321, and signals CLK2-0 and CLK2-90 generated by angle-advancing the signal CLK2 by predetermined phases and, that correspond to the timings. The timings are the timings A to D. For example, the DLL 322 is a delay circuit that supplies to the data recovering unit 323 the signal CLK2-0 produced by not delaying the phase of the signal CLK2 and the CLK2-90 produced by advancing the phase of the signal CLK2 by 90 degrees, based on the signal CLK2 generated by the reception clock generator 321.

Details of the data recovering unit 323 will be described later with reference to FIG. 4. The deserializer 324 restores the data group transmitted by the transmitting apparatus from a signal SDATA based on the value of the signal DVALID. Exemplary restoration of the data by the deserializer 324 will be described later with reference to FIG. 18. In this example, even when the change of the restoration timing is discrete, it is the premise that two or more timings are not skipped in the change of the restoration timing.

In the embodiment, the data recovering unit 323 includes a circuit that realizes the functions of both of preventing the loss of the data when the change of the restoration timing does not follow the order of generation, and preventing duplication of the data when the change follows the order of generation. Not limited to this, for example, when the relation between the frequencies of the reception clock and the transmission clock is clear in advance, the data recovering unit 323 only has to include a circuit that realizes either one of those two functions.

Figure 4:
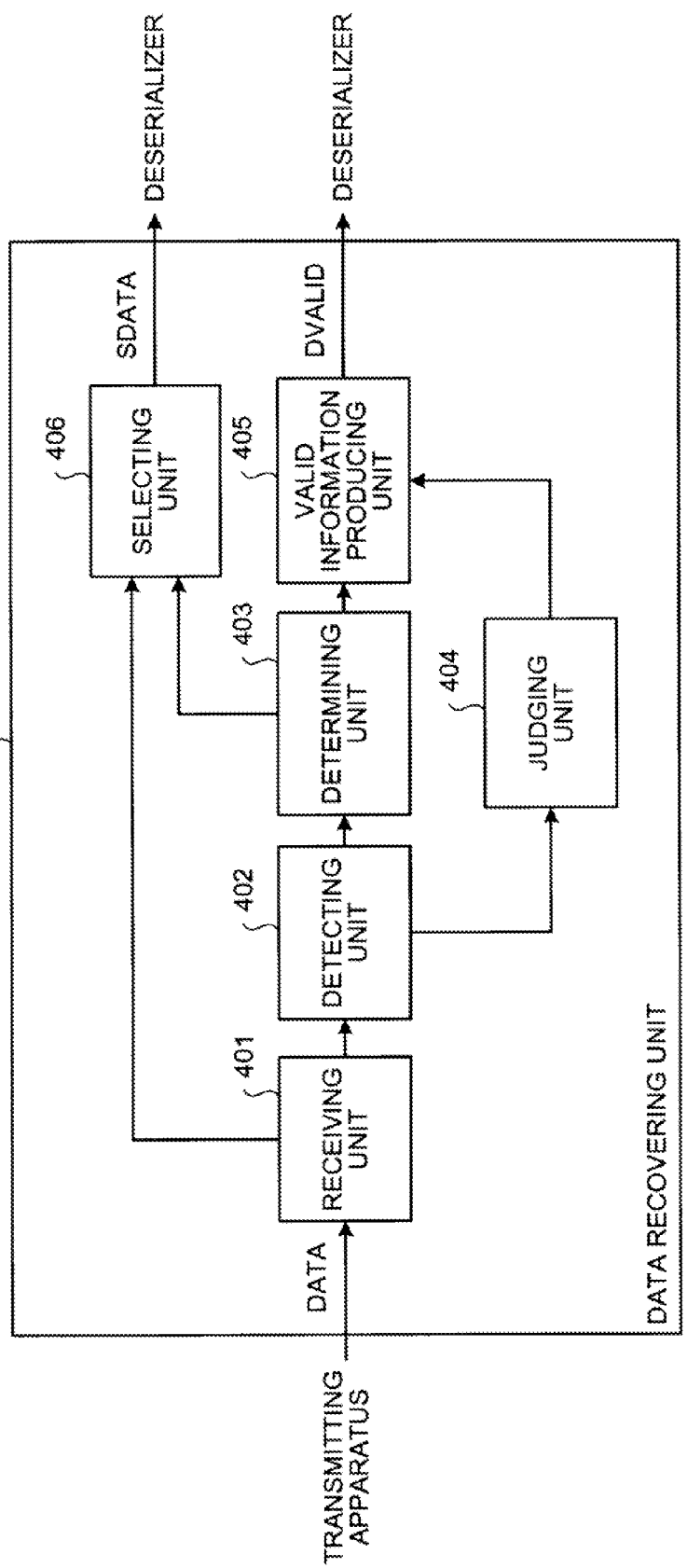
FIG. 4 is an explanatory diagram of a detailed example of a data recovering unit 323.

FIG. 4 is an explanatory diagram of a detailed example of the data recovering unit 323. The data recovering unit 323 includes a receiving unit 401, a detecting unit 402, a determining unit 403, a judging unit 404, a selecting unit 406, and a valid information producing unit 405. Each of these units is formed by elements such as, for example, an AND that is a logical product circuit, an INVERTER that is an inverting circuit, an OR that is a logical addition circuit, and an FF (Flip Flop) that is a latching circuit. For example, each of these units may realize its function by defining its function by description in Verilog-HDL (Hardware Description Language), etc., and using FPGA (Field Programmable Gate Array) after logically synthesizing the description.

Figure 5:
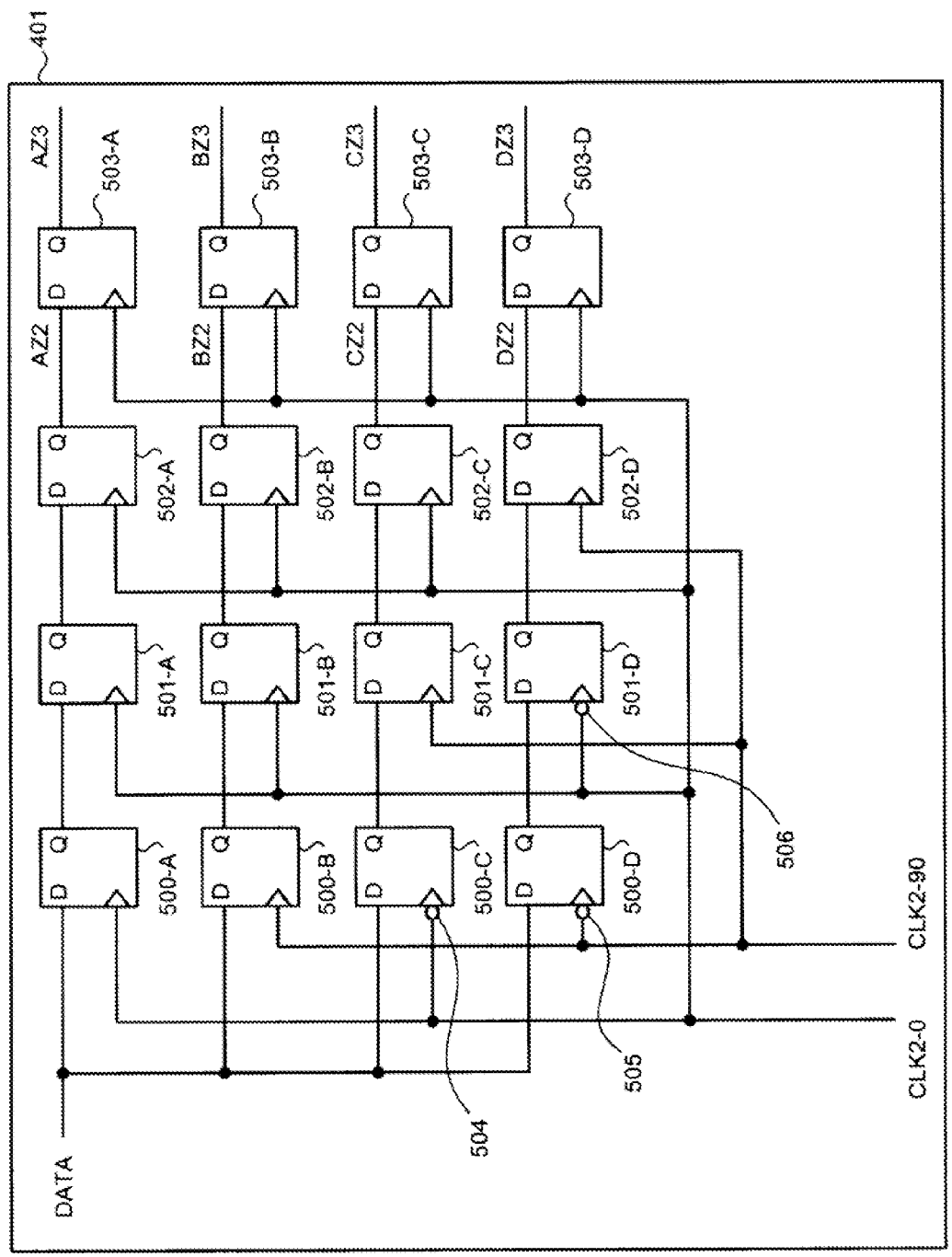
FIG. 5 is an explanatory diagram of an example of a receiving unit 401.

FIG. 5 is an explanatory diagram of an example of the receiving unit 401. The receiving unit 401 receives at the timings using the signals CLK2-0 and CLK2-90. As above, the timings are the timings A to D. For example, for example, the receiving unit 401 receives the signal DATA at a rising edge timing and a falling edge timing of the signal CLK2-0 and those of the signal CLK2-90. For example, the receiving unit 401 includes FFs 500-A to 500-D, 501-A to 501-D, 502-A to 502-D, and 503-A to 503-D, and INVERTERs 504 to 506. Each of the clocks is supplied in four stages to the receiving unit 401 to avoid a meta-stable state and move the data captured at different timings into the same time domain.

The receiving unit 401 receives the signal DATA at the rising edge timing of the signal CLK2-0 using the FF 500-A, and transfers the signal DATA received at the rising edge timing of the signal CLK2-0 using the FFs 501-A to 503-A. An output signal of the FF 502-A is a signal AZ2 and that of the FF 503-A is a signal AZ3. The value of the signal AZ3 is the data acquired by receiving the signal DATA at the rising edge timing of the signal CLK2-0.

The signal CLK2-0 is input into each of the FFs 500-A to 503-A as a clock signal. The signal DATA is input into the FF 500-A as a data signal. An output signal of the FF 500-A is input into the FF 501-A as a data signal. An output signal of the FF 501-A is input into the FF 502-A as a data signal. An output signal of the FF 502-A is input into the FF 503-A as a data signal.

The receiving unit 401 receives the signal DATA at the rising edge timing of the signal CLK2-90 using the FF 500-B and transfers the signal DATA received using the FF 500-B, at the rising edge timing of the signal CLK2-0 using the FFs 501-B to 503-B. An output signal of the FF 502-B is a signal BZ2 and an output signal of the FF 503-B is a signal BZ3. The value of the signal BZ3 is data acquired by receiving the signal DATA at the rising edge timing of the signal CLK2-90.

The signal CLK2-90 is input into the FF 500-B as a clock signal. The signal CLK2-0 is input into each of the FFs 501-B to 503-B as a clock signal. The signal DATA is input into the FF 500-B as a data signal. The FF 500-B is input into the FF 501-B as a data signal. The FF 501-B is input into the FF 502-B as a data signal. The FF 502-B is input into the FF 503-B as a data signal.

The receiving unit 401 receives the signal DATA at the falling edge timing of the signal CLK2-0 using the FF 500-C and transfers the signal DATA received, at the rising edge timing of the signal CLK2-90 using the FF 501-C. The receiving unit 401 performs transfer at the rising edge timing of the signal CLK2-0 using the FFs 502-C and 503-C. An output signal of the FF 502-C is a signal CZ2 and an output signal of the FF 503-C is a signal CZ3. The value of the signal CZ3 is data acquired by receiving the signal DATA at the falling edge timing of the signal CLK2-0.

The signal CLK2-0 is input into the INVERTER 504. An output signal of the INVERTER 504 is input into the FF 500-C as a clock signal. The CLK2-90 is input into each of the FFs 501-C and 502-C as a clock signal. The signal CLK2-0 is input into the FF 503-C as a clock signal. The signal DATA is input into the FF 500-C as a data signal. An output signal of the FF 500-C is input into the FF 501-C as a data signal. An output signal of the FF 501-C is input into the FF 502-C as a data signal. An output signal of the FF 502-C is input into the FF 503-C as a data signal.

The receiving unit 401 receives the signal DATA at the falling edge timing of the signal CLK2-90 using the FF 500-D, transfers the signal DATA received, at the rising edge timing of the signal CLK2-0 using the FF 501-C, at the rising edge timing of the signal CLK2-90 using the FF 502-C, and at the rising edge timing of the signal CLK2-0 using the FF 503-C. An output signal of the FF 502-C is the CZ2 and an output signal of the FF 503-C is a signal DZ3. The value of the signal DZ3 is the signal DATA received at the rising edge timing of the signal CLK2-90.

The signal CLK2-90 is input into an INVERTER 505. The signal CLK2-0 is input into the INVERTER 506. An output signal of the INVERTER 505 is input into the FF 500-D as a clock signal. An output signal of the INVERTER 506 is input into the FF 501-D as a clock signal. The signal CLK2-90 is input into the FF 502-D as a clock signal. The signal CLK2-0 is input into the FF 503-D as a clock signal. The signal DATA is input into the FF 500-D as a data signal. An output signal of the FF 500-D is input into the FF 501-D as a data signal. An output signal of the FF 501-D is input into the FF 502-D as a data signal. An output signal of the FF 502-D is input into the FF 503-D as a data signal.

Figure 6:
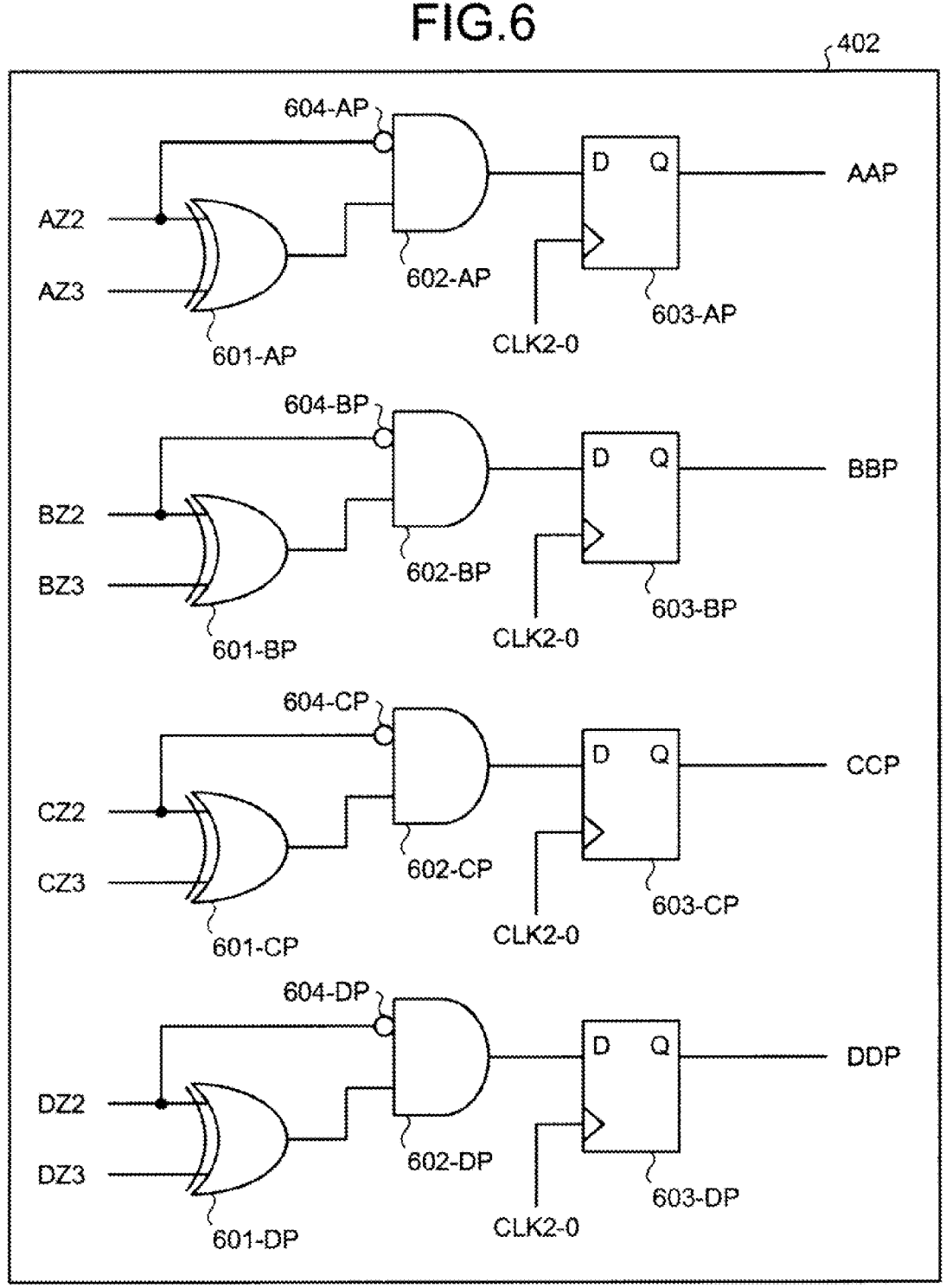
FIGS. 6 and 7 are explanatory diagrams of detailed examples of a detecting unit 402.
Figure 7:
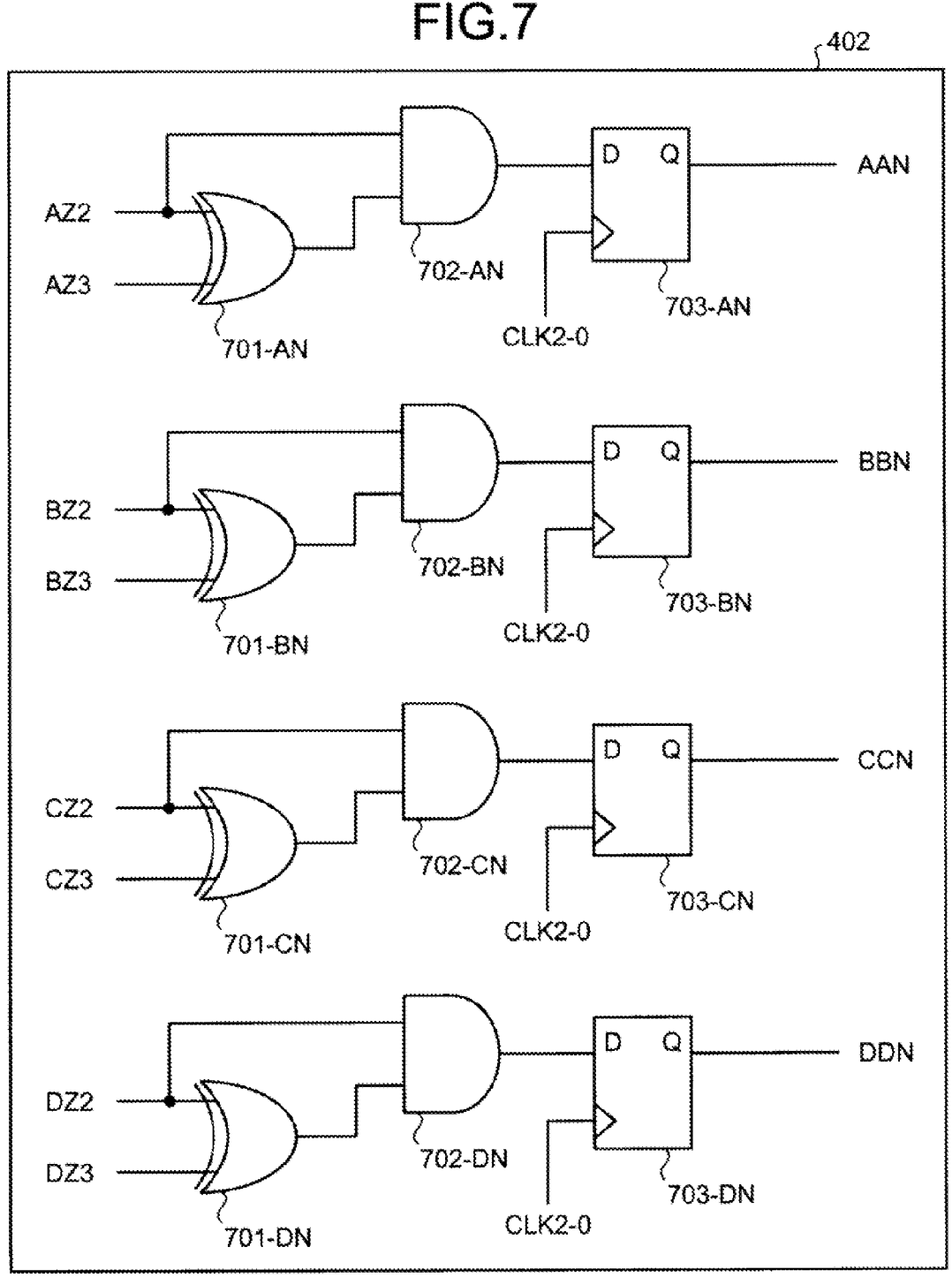

FIGS. 6 and 7 are explanatory diagrams of detailed examples of the detecting unit 402. The detecting unit 402 detects the rising edge and the falling edge of each of the data received by the receiving unit 401.

For example, for example, the detecting unit 402 outputs a signal indicating positive transition of the received data at each timing of the timings and a signal indicating negative transition of the received data at the timing. The "positive transition" is a change from "0" to "1" and therefore, the "signal indicating the positive transition" is a signal indicating detection of a change that is the falling edge of the data received. The "negative transition" is a change from "1" to "0" and therefore, the "signal indicating the negative transition" is a signal indicating detection of a change that is the rising edge of the data received. In FIG. 6, signals each indicating detection of a change that is the falling edge of the data received are signals AAP, BBP, CCP, and DDP. In the example of FIG. 7, signals each indicating detection of a change that is the rising edge of the data received are signals AAN, BBN, CCN, and DDN.

For example, the detecting unit 402 includes EXORs 601-AP to 601-DP that are exclusive-OR circuits, ANDS 602-AP to 602-DP, and FFs 603-AP to 603-DP, INVERTERS 604-AP to 604-DP, and further includes EXORs 701-AN to 701-DN, ANDs 702-AN to 702-DN, and FFs 703-AN to 703-DN.

Exemplary detection of the falling edge of the received data received at the timing A will be described with reference to FIG. 6. The falling edge of the received data received at the timing A is detected by the EXOR 601-AP, the AND 602-AP, the FF 603-AP, and the INVERTER 604-AP. When the value is "1" of the signal AAP that is an output signal of the FF 603-AP, this indicates the detection of the falling edge of the received data received at the timing A and, when the value is "0" of the signal AAP, this indicates no detection of the falling edge of the received data received at the timing A.

The signal AZ2 is input into the INVERTER 604-AP. The signals AZ2 and AZ3 are input into the EXOR 601-AP. An output signal of the EXOR 601-AP and an output signal of the INVERTER 604-AP are input into the AND 602-AP. An output signal of the AND 602-AP is input into the FF 603-AP as a data signal and the signal CLK2-0 is input thereinto as a clock signal. An output signal of the FF 603-AP is the signal AAP. When the value of the signal AZ2 is "0" and the values of the signals AZ2 and AZ3 are different from each other, the value of the signal AAP is "1" and, in the other cases, the value of the signal AAP is "0".

Exemplary detection of the falling edge of the received data received at the timing B will be described with reference to FIG. 6. The falling edge of the received data received at the timing B is detected by the EXOR 601-BP, the AND 602-BP, the FF 603-BP, and the INVERTER 604-BP. When the value is "1" of the signal BBP that is an output signal of the FF 603-BP, this indicates the detection of the falling edge of the received data received at the timing B and, when the value is "0" of the signal BBP, this indicates no detection of the falling edge of the received data received at the timing B.

The signal BZ2 is input into the INVERTER 604-BP. The signals BZ2 and BZ3 are input into the EXOR 601-BP. Output signals of the EXOR 601-BP and the INVERTER 604-BP are input into the AND 602-BP. An output signal of the AND 602-BP is input into the FF 603-BP as a data signal and the signal CLK2-0 is input thereinto as a clock signal. An output signal of the FF 603-BP is the signal BBP. When the value of the signal BZ2 is "0" and the values of the signals BZ2 and BZ3 are different from each other, the value of the signal BBP is "1" and, in the other cases, the value of the signal BBP is "0".

Exemplary detection of the falling edge of the received data received at the timing C will be described with reference to FIG. 6. The falling edge of the received data received at the timing C is detected by the EXOR 601-CP, the AND 602-CP, the FF 603-CP, and the INVERTER 604-CP. When the value is "1" of the signal CCP that is an output signal of the FF 603-CP, this indicates the detection of the falling edge of the received data received at the timing C and, when the value is "0" of the signal CCP, this indicates no detection of the falling edge of the received data received at the timing C.

The signal CZ2 is input into the INVERTER 604-CP. The signals CZ2 and CZ3 are input into the EXOR 601-CP. Output signals of the EXOR 601-CP and the INVERTER 604-CP are input into the AND 602-CP. An output signal of the AND 602-CP is input into the FF 603-CP as a data signal and the signal CLK2-0 is input thereinto as a clock signal. An output signal of the FF 603-CP is the signal CCP. When the value of the signal CZ2 is "0" and the values of the signals CZ2 and CZ3 are different from each other, the value of the signal CCP is "1" and, in the other cases, the value of the signal CCP is "0".

Exemplary detection of the falling edge of the received data received at the timing D will be described with reference to FIG. 6. The falling edge of the received data received at the timing D is detected by the EXOR 601-DP, the AND 602-DP, the FF 603-DP, and the INVERTER 604-DP. When the value is "1" of the signal DDP that is an output signal of the FF 603-DP, this indicates the detection of the falling edge of the received data received at the timing D and, when the value is "0" of the signal DDP, this indicates no detection of the falling edge of the received data received at the timing D.

A signal DZ2 is input into the INVERTER 604-DP. The signals DZ2 and DZ3 are input into the EXOR 601-DP. Output signals of the EXOR 601-DP and the INVERTER 604-DP are input into the AND 602-DP. An output signal of the AND 602-DP is input into the FF 603-DP as a data signal and the signal CLK2-0 is input thereinto as a clock signal. An output signal of the FF 603-DP is the signal DDP. When the value of the signal DZ2 is "0" and the values of the signals DZ2 and DZ3 are different from each other, the value of the signal DDP is "1" and, in the other cases, the value of the signal DDP is "0".

Exemplary detection of the rising edge of the received data received at the timing A will be described with reference to FIG. 7. The rising edge of the received data received at the timing A is detected by the EXOR 701-AN, the AND 702-AN, and the FF 703-AN. When the value is "1" of the signal AAN that is an output signal of the FF 703-AN, this indicates the detection of the rising edge of the received data received at the timing A and, when the value is "0" of the signal AAN, this indicates no detection of the rising edge of the received data received at the timing A.

The signals AZ2 and AZ3 are input into the EXOR 701-AN. An output signal of the EXOR 701-AN and the signal AZ2 are input into the AND 702-AN. An output signal of the AND 702-AN is input into the FF 703-AN as a data signal and the signal CLK2-0 is input thereinto as a clock signal. When the value of the signal AZ2 is "1" and the value of the signal AZ3 is "0", the value of the signal AAN is "1" and, in the other cases, the value of the signal AAN is "0".

Exemplary detection of the rising edge of the received data received at the timing B will be described with reference to FIG. 7. The rising edge of the received data received at the timing B is detected by the EXOR 701-BN, the AND 702-BN, and the FF 703-BN. When the value is "1" of the signal BBN that is an output signal of the FF 703-BN, this indicates the detection of the rising edge of the received data received at the timing B and, when the value is "0" of the signal BBN, this indicates no detection of the rising edge of the received data received at the timing B.

The signals BZ2 and BZ3 are input into the EXOR 701-BN. An output signal of the EXOR 701-BN and the signal BZ2 are input into the AND 702-BN. An output signal of the AND 702-BN is input into the FF 703-BN as a data signal and the signal CLK2-0 is input thereinto as a clock signal. When the value of the signal BZ2 is "1" and the value of the signal BZ3 is "0", the value of the signal BBN is "1" and, in the other cases, the value of the signal BBN is "0".

Exemplary detection of the rising edge of the received data received at the timing C will be described with reference to FIG. 7. The rising edge of the received data received at the timing C is detected by the EXOR 701-CN, the AND 702-CN, and the FF 703-CN. When the value is "1" of the signal CCN that is an output signal of the FF 703-CN, this indicates the detection of the rising edge of the received data received at the timing C and, when the value is "0" of the signal CCN, this indicates no detection of the rising edge of the received data received at the timing C.

The signals CZ2 and CZ3 are input into the EXOR 701-CN. An output signal of the EXOR 701-CN and the signal CZ2 are input into the AND 702-CN. An output signal of the AND 702-CN is input into the FF 703-CN as a data signal and the signal CLK2-0 is input thereinto as a clock signal. When the value of the signal CZ2 is "1" and the value of the signal CZ3 is "0", the value of the signal CCN is "1" and, in the other cases, the value of the signal CCN is "0".

Exemplary detection of the rising edge of the received data received at the timing D will be described with reference to FIG. 7. The rising edge of the received data received at the timing D is detected by the EXOR 701-DN, the AND 702-DN, and the FF 703-DN. When the value is "1" of the signal DDN that is an output signal of the FF 703-DN, this indicates the detection of the rising edge of the received data received at the timing D and, when the value is "0" of the signal DDN, this indicates no detection of the rising edge of the received data received at the timing D.

The signals DZ2 and DZ3 are input into the EXOR 701-DN. An output signal of the EXOR 701-DN and the signal DZ2 are input into the AND 702-DN. An output signal of the AND 702-DN is input into the FF 703-DN as a data signal and the signal CLK2-0 is input thereinto as a clock signal. When the value of the signal DZ2 is "1" and the value of the signal DZ3 is "0", the value of the signal DDN is "1" and, in the other cases, the value of the signal DDN is "0".

Figure 8:
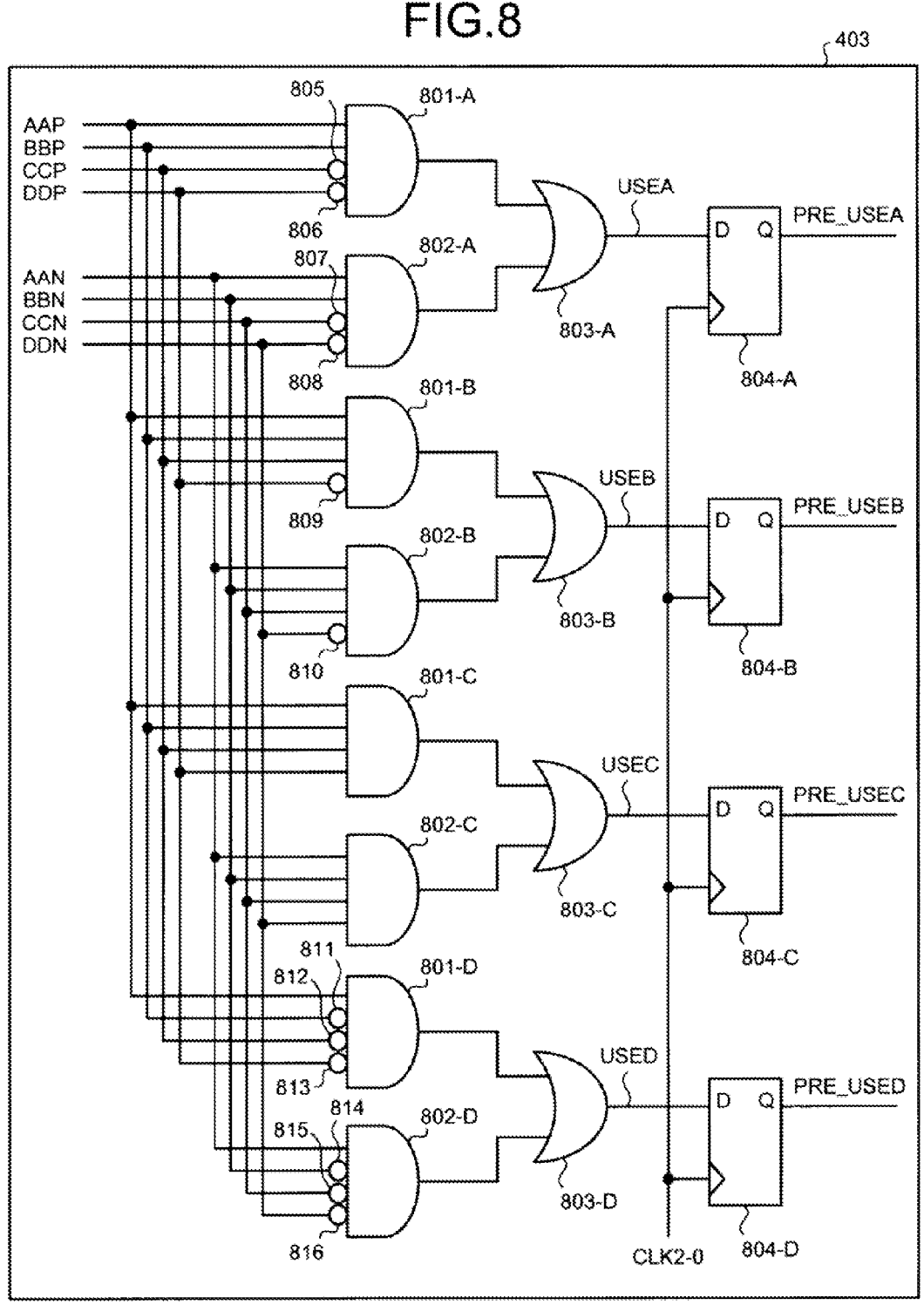
FIG. 8 is an explanatory diagram of an example of a determining unit 403.

FIG. 8 is an explanatory diagram of an example of the determining unit 403. The determining unit 403 produces the selection signals to determine the restoration timing to restore the data of the timings and the previous selection signals retaining the selection signals, based on the rising edge and the falling edge of each of the received data detected by the detecting unit 402. In the example of FIG. 8, the selection signals are signals USEA, USEB, USEC, and USED. Of the signals USEA, USEB, USEC, and USED, the values of the two or more signals do not each simultaneously become "1". In the example of FIG. 8, the previous selection signals are signals PRE_USEA, PRE_USEB, PRE_USEC, and PRE_USED. Of the signals PRE_USEA, PRE_USEB, PRE_USEC, and PRE_USED, the values of the two or more signals do not each simultaneously become "1".

The determining unit 403 includes ANDs 801-A to 801-D and 802-A to 802-D, ORs 803-A to 803-D, FFs 804-A to 804-D, and INVERTERs 805 to 816.

When the values of the signals AAP, BBP, CCP, and DDP are AAP=BBP=1 and CCP=DDP=0, or when the values of the signals AAN, BBN, CCN, and DDN are AAN=BBN=1 and CCN=DDN=0, the data to be restored is the data received at the timing A and therefore, the value of the signal USEA is "1" and, in the other cases, the value of the signal USEA is "0".

When the values of the signals AAP, BBP, CCP, and DDP are AAP=BBP=CCP=1 and DDP=0, or when the values of the signals AAN, BBN, CCN, and DDN are AAN=BBN=CCN=1 and DDN=0, the data to be restored is the data received at the timing B and therefore, the value of the signal USEB is "1" and, in the other cases, the value of the signal USEB is "0".

When the values of the signals AAP, BBP, CCP, and DDP are AAP=BBP=CCP=DDP=1, or when the values of the signals AAN, BBN, CCN, and DDN are AAN=BBN=CCN=DDN=1, the data to be restored is the data received at the timing C and therefore, the value of the signal USEC is "1" and, in the other cases, the value of the signal USEC is "0".

When the values of the signals AAP, BBP, CCP, and DDP are AAP=1 and BBP=CCP=DDP=0, or when the values of the signals AAN, BBN, CCN, and DDN are AAN=1 and BBN=CCN=DDN=0, the data to be restored is the data received at the timing D and therefore, the value of the signal USED is "1" and, in the other cases, the value of the signal USED is "0".

The value of the signal USEA is determined by the INVERTERs 805 to 808, the ANDs 801-A and 802-A, and the OR 803-A.

The signal CCP is input into the INVERTER 805. The signal DDP is input into the INVERTER 806. The signals AAP and BBP and output signals of the INVERTERs 805 and 806 are input into the AND 801-A.

The signal CCN is input into the INVERTER 807. The signal DDN is input into the INVERTER 808. The signals AAN and BBN and output signals of the INVERTERs 807 and 808 are input into the AND 802-A.

Output signals of the ANDs 801-A and 802-A are input into the OR 803-A. An output signal of the OR 803-A is the signal USEA. The signal USEA is input into the FF 804-A as a data signal and the signal CLK2-0 is input thereinto as a clock signal. An output signal of the FF 804-A is the signal PRE_USEA.

The value of the signal USEB is determined by the INVERTERs 809 and 810, the ANDs 801-B and 802-B, and the OR 803-B.

The signal DDP is input into the INVERTER 809. The signals AAP, BBP, and CCP and an output signal of the INVERTER 809 are input into the AND 801-B.

The signal DDN is input into the INVERTER 810. The signals AAN, BBN, and CCN and an output signal of the INVERTER 810 are input into the AND 802-B.

Output signals of the ANDs 801-B and 802-B are input into the OR 803-B. An output signal of the OR 803-B is the signal USEB. The signal USEB is input into the FF 804-B as a data signal and the signal CLK2-0 is input thereinto as a clock signal. An output signal of the FF 804-B is the signal PRE_USEB.

The value of the signal USEC is determined by the ANDs 801-C and 802-C, and the OR 803-C.

The signals AAP, BBP, CCP and DDP are input into the AND 801-C. The signals AAN, BBN, and CCN and DDN are input into the AND 802-C.

Output signals of the ANDs 801-C and 802-C are input into the OR 803-C. An output signal of the OR 803-C is the signal USEC. The signal USEC is input into the FF 804-C as a data signal and the signal CLK2-0 is input thereinto as a clock signal. An output signal of the FF 804-C is the signal PRE_USEC.

The value of the signal USED is determined by the INVERTERs 811 to 816, the ANDs 801-D and 802-D, and the OR 803-D.

The signal BBP is input into the INVERTER 811. The signal CCP is input into the INVERTER 812. The signal DDP is input into the INVERTER 813. The signal AAP and output signals of the INVERTERs 811 to 813 are input into the AND 801-D.

The signal BBN is input into the INVERTER 814. The signal CCN is input into the INVERTER 815. The signal DDN is input into the INVERTER 816. The signal AAN and output signals of the INVERTERs 814 to 816 are input into the AND 802-D.

Output signals of the ANDs 801-D and 802-D are input into the OR 803-D. An output signal of the OR 803-D is the signal USED. The signal USED is input into the FF 804-D as a data signal and the signal CLK2-0 is input thereinto as a clock signal. An output signal of the FF 804-D is the signal PRE_USED.

Figure 9:
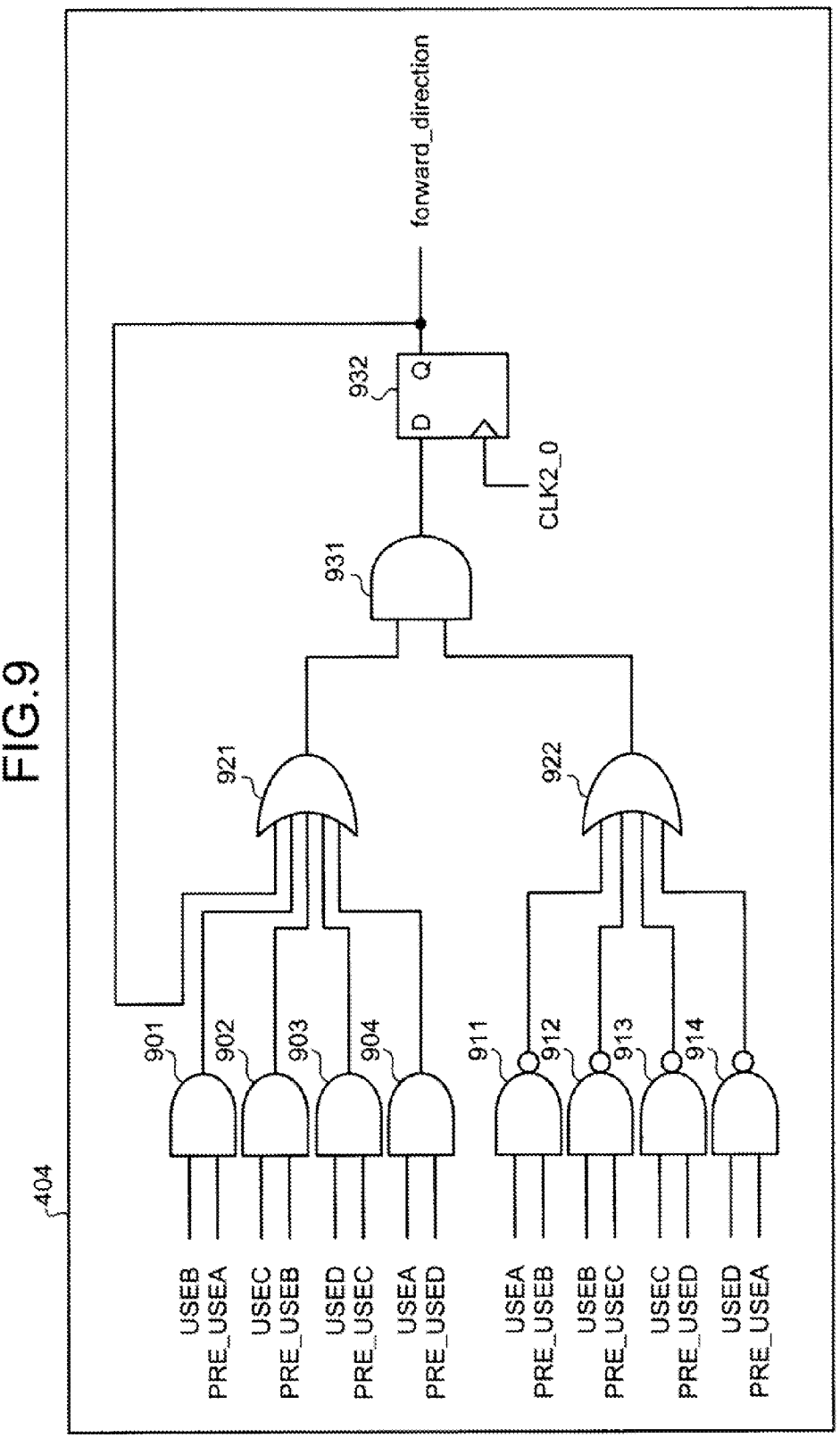
FIG. 9 is an explanatory diagram of the details of a judging unit 404.

FIG. 9 is an explanatory diagram of the details of the judging unit 404. When the change of the restoration timing is discrete, it is unknown whether the change of the restoration timing follows the order of generation. The judging unit 404 judges the transition direction of the restoration timing of the timings based on the selection signals and the previous selection signal.

In the example of FIG. 9, a signal forward_direction is a transition direction signal indicating the transition direction of the restoration timing. When the value of the signal forward_direction is "1", this indicates that the transition direction is the forward direction to the angle advancement direction. When the value of the signal forward_direction is "0", this indicates that the transition direction is the reverse direction to the angle advancement direction.

For example, the judging unit 404 includes ANDs 901 to 904 and 931, NANDs 911 to 914, ORs 921 and 922, and an FF 932.

The judging unit 404 judges whether the transition direction of the restoration timing of the timings is the forward direction to the angle advancement direction, using the ANDs 901 to 904.

The signals USEB and PRE_USEA are input into the AND 901. Thereby, the judging unit 404 is able to detect the change of the restoration timing from the timing A to the timing B. The signals USEC and PRE_USEB are input into the AND 902. Thereby, the judging unit 404 is able to detect the change of the restoration timing from the timing B to the timing C. The signals USED and PRE_USEC are input into the AND 903. Thereby, the judging unit 404 is able to detect the change of the restoration timing from the timing C to the timing D. The signals USEA and PRE_USED are input into the AND 904. Thereby, the judging unit 404 is able to detect the change of the restoration timing from the timing D to the timing A.

The judging unit 404 judges whether the transition direction of the restoration timing of the timings is the reverse direction to the angle advancement direction, using the NANDs 911 to 914.

For example, the signals USEA and PRE_USEB are input into the NAND 911. Thereby, the judging unit 404 is able to detect the change of the restoration timing from the timing B to the timing A.

The signals USEB and PRE_USEC are input into the NAND 912. Thereby, the judging unit 404 is able to detect the change of the restoration timing from the timing C to the timing B. The signals USEC and PRE_USED are input into the NAND 913. Thereby, the judging unit 404 is able to detect the change of the restoration timing from the timing D to the timing C. The signals USED and PRE_USEA are input into the NAND 914. Thereby, the judging unit 404 is able to detect the change of the restoration timing from the timing A to the timing D.

The signal forward_direction and output signals of the ANDs 901 to 904 are input into the OR 921. Output signals of the NANDs 911 to 914 are input into the OR 922.

Output signals of the ORs 921 and 922 are input into the AND 931. An output signal of the AND 931 is input into the FF 932 as a data signal and the signal CLK2-0 is input thereinto as a clock signal. An output signal of the FF 932 is the signal forward_direction. Because the signal forward_direction is input into the OR 921, when the value of the signal forward_direction is "1", the value of the signal forward_direction is thereafter retained by the FF 932. Therefore, the transition direction of the restoration timing is judged during the consecutive changes of the restoration timing and the judgment result is retained. Therefore, during the discrete change of the change of the restoration timing, the receiving apparatus 302 is able to know the transition direction of the restoration timing by referring to the judgment result retained.

As above, when the value of the signal forward_direction is "1", this indicates that the transition direction of the restoration timing is the forward direction to the angle advancement direction. Therefore, when the value of the signal forward_direction is "1", this indicates that the frequency of the signal CLK2 is higher than that of the signal CLK1.

On the other hand, as above, when the value of the signal forward_direction is "0", this indicates that the transition direction of the restoration timing is the reverse direction to the angle advancement direction. When the value of the signal forward_direction is "0", this indicates that the frequency of the signal CLK1 is higher than that of the signal CLK2. Therefore, the restoration is able to be executed using the value of the signal forward_direction even when the relation is not determined in advance between the frequencies of the signals CLK1 and CLK2.

FIG. 10 is an explanatory diagram of a method of selecting a signal SDATA using a signal DVALID. When the values of the signals DVALID[0] and DVALID[1] are both "0", the signals SDATA[0] and SDATA[1] are not to be restored. When the values of the signals DVALID[1] and DVALID[0] are both "0", three cases are present. The first one thereof is the case where the value of the signal forward_direction is "1" and the restoration timing is changed from the timing D to the timing B. The second one thereof is the case where the value of the signal forward_direction is "1" and the restoration timing is changed from the timing C to the timing A. The third one thereof is the case where the restoration timing is changed from the timing D to the timing A. When the restoration timing is changed from the timing D to the timing A, the value of the signal forward_direction is "1".

When the value of the signal DVALID[0] is "1" and the value of the signal DVALID[1] is "0", the value of the signal SDATA[0] is the data to be restored. When the value of the signal DVALID[0] is "0" and the value of the signal DVALID[1] is "1", the data to be restored is not present.

When the values of the signals DVALID[0] and DVALID[1] are both "1", the values of the signals SDATA[0] and SDATA[1] each are the data to be restored. When the values of the signals DVALID[1] and DVALID[0] are both "1", three cases are present. The first one thereof is the case where the value of the signal forward_direction is "0" and the restoration timing is changed from the timing A to the timing C. The second one thereof is the case where the value of the signal forward_direction is "0" and the restoration timing is changed from the timing B to the timing D. The third one thereof is the case where the restoration timing is changed from the timing A to the timing D.

Figure 11:
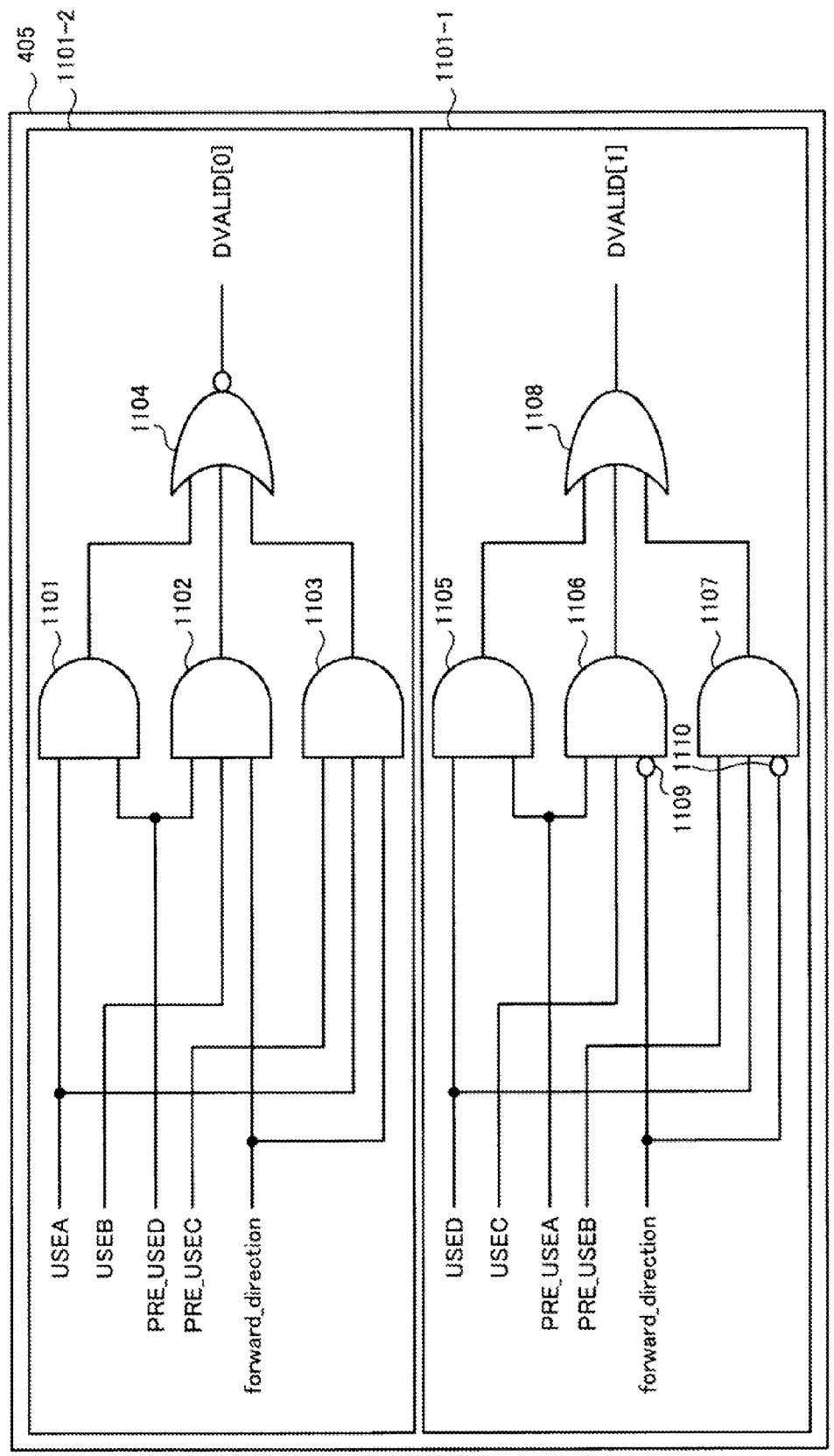
FIG. 11 is an explanatory diagram of a detailed example of a valid information producing unit 405.

FIG. 11 is an explanatory diagram of a detailed example of the valid information producing unit 405. The valid information producing unit 405 produces valid information of the transfer data selected by the selecting unit 406 based on the selection signals, the previous selection signals, and the transition direction judged by the judging unit 404. In the example of FIG. 11, the valid information is a signal DVALID[1:0]. As above, the transition direction is indicated by the signal forward_direction.

For example, the valid information producing unit 405 produces the valid information of the transfer data selected by the selecting unit 406 based on the transition direction and the determination result as to whether a time period between the restoration timing corresponding to the previous selection signal used by the selecting unit 406 to select the previous transfer data and the restoration timing corresponding to the selection signal used by the selecting unit 406 to select the current transfer data, of the timings exceeds the cycle of the timings.

The valid information producing unit 405 produces all of the valid information of the transfer data selected by the selecting unit 406 as false values when the transition direction is the forward_direction to the angle advancement direction and the time period between the restoration timing corresponding to the previous selection signal used by the selecting unit 406 to select the previous transfer data and the restoration timing corresponding to the selection signal used by the selecting unit 406 to select the current transfer data, of the timings exceeds the cycle of the timings.

For example, for example, when the value of the signal forward_direction is "1", the value of the signal PRE_USED is "1", and the value of the signal USEB is "1", the valid information producing unit 405 sets both of the values of the signals DVALID[1] and DVALID[0] to each be "0". In the case where the value of the signal forward_direction is "1", when the restoration timing is changed from the timing D to the timing B, the time period between the previous restoration timing and the current restoration timing exceeds one cycle of the clock.

Otherwise, for example, when the value of the signal forward_direction is "1", the value of the signal PRE_USEC is "1", and the value of the signal USEA is "1", the valid information producing unit 405 sets both of the values of the signals DVALID[1] and DVALID[0] to each be "0". In the case where the value of the signal forward_direction is "1", when the restoration timing is changed from the timing C to the timing A, the time period between the previous restoration timing and the current restoration timing exceeds one cycle of the clock.

The valid information producing unit 405 produces all of the valid information of the transfer data selected by the selecting unit 406 as true values when the transition direction is the reverse direction to the angle advancement direction and the time period between the restoration timing corresponding to the previous selection signal used by the selecting unit 406 to select the previous transfer data and the restoration timing corresponding to the selection signal used by the selecting unit 406 to select the current transfer data, of the timings exceeds the cycle of the timings.

For example, for example, when the value of the signal forward_direction is "0", the value of the signal PRE_USEA is "1", and the value of the signal USEC is "1", the valid information producing unit 405 sets both of the values of the signals DVALID[1] and DVALID[0] to each be "1". In the case where the value of the signal forward_direction is "0", when the restoration timing is changed from the timing A to the timing C, the time period between the previous restoration timing and the current restoration timing exceeds one cycle of the clock.

Otherwise, for example, when the value of the signal forward_direction is "0", the value of the signal PRE_USEB is "1", and the value of the signal USED is "1", the valid information producing unit 405 sets both of the value of the signals DVALID[1] and DVALID[0] to each be "1". In the case where the value of the signal forward_direction is "0", when the restoration timing is changed from the timing B to the timing D, the time period between the previous restoration timing and the current restoration timing exceeds one cycle of the clock.

The valid information producing unit 405 produces the valid information of any one of the transfer data selected by the selecting unit 406 as a true value when the time period between the restoration timing corresponding to the previous selection signal used by the selecting unit 406 to select the previous transfer data and the restoration timing corresponding to the selection signal used by the selecting unit 406 to select the current transfer data, of the timings exceeds the cycle of the timings.

For example, for example, when the value of the signal PRE_USED is "1" and the value of the signal USEA is "1", the valid information producing unit 405 sets both of the values of the signals DVALID[1] and DVALID[0] to each be "0". For example, for example, when the value of the signal PRE_USEA is "1" and the value of the signal USED is "1", the valid information producing unit 405 sets both of the values of the signals DVALID[1] and DVALID[0] to each be "1".

For example, the valid information producing unit 405 includes a first and a second valid information producing units 1100-1 and 1100-2. The first valid information producing unit 1100-1 determines the value of the signal DVALID[1]. The second valid information producing unit 1100-2 determines the value of the signal DVALID[0].

The first valid information producing unit 1100-1 will first be described. The first valid information producing unit 1100-1 includes ANDs 1105, 1106, and 1107, an OR 1108, and INVERTERs 1109 and 1110.

The signals USED and PRE_USEA are input into the AND 1105. Thereby, the first valid information producing unit 1100-1 detects that the values of the signals PRE_USEA and USED are each "1".

The signal forward_direction is input into the INVERTER 1109. The signals USEC and PRE_USEA and an output signal of the INVERTER 1109 are input into the AND 1106. Thereby, the first valid information producing unit 1100-1 detects that the value of the signal forward_direction is "0" and the values of the signals PRE_USEA and USEC are each "1".

The signal forward_direction is input into the INVERTER 1110. The signals PRE_USEB and USED and an output signal of the INVERTER 1110 are input into the AND 1107. Thereby, the first valid information producing unit 1100-1 detects that the value of the signal forward_direction is "0" and the values of the signals PRE_USEB and USED are each "1".

Output signals of the ANDs 1105, 1106, and 1107 are input into the OR 1108. An output signal of the OR 1108 is the signal DVALID[1]. Thereby, the first valid information producing unit 1100-1 sets the value of the signal DVALID[1] to be "1" when the value is "1" of the output signal of any one of the ANDs 1105 to 1107, and sets the value of the signal DVALID[1] to be "0" when none of the values of the output signals of the ANDs 1105 to 1107 is "1".

The second valid information producing unit 1100-2 will be described in detail. The second valid information producing unit 1100-2 includes ANDs 1101, 1102, and 1103, and a NOR 1104.

The signals USEA and PRE_USED are input into the AND 1101. Thereby, the second valid information producing unit 1100-2 is able to detect that the values of the signals PRE_USED and USEA are each "1".

The signals PRE_USED, USEB, and forward_direction are input into the AND 1102. Thereby, the second valid information producing unit 1100-2 is able to detect that the value of the signal forward_direction is "1" and the values of the signals PRE_USED and USEB are each "1".

The signals PRE_USEC, USEA, and forward_direction are input into the AND 1103. Thereby, the second valid information producing unit 1100-2 is able to detect that the value of the signal forward_direction is "1" and the values of the signals PRE_USEC and USEA are each "1"

Output signals of the ANDs 1101 to 1103 are input into the NOR 1104. An output signal of the NOR 1104 is the signal DVALID[0]. Thereby, the second valid information producing unit 1100-2 sets the value of the signal DVALID[0] to be "0" when the value of any one of the output signals of the ANDs 1101 to 1103 is "1", and sets the value of the signal DVALID[0] to be "1" when none of the values of the output signals of the ANDs 1101 to 1103 is "1".

Figure 12:
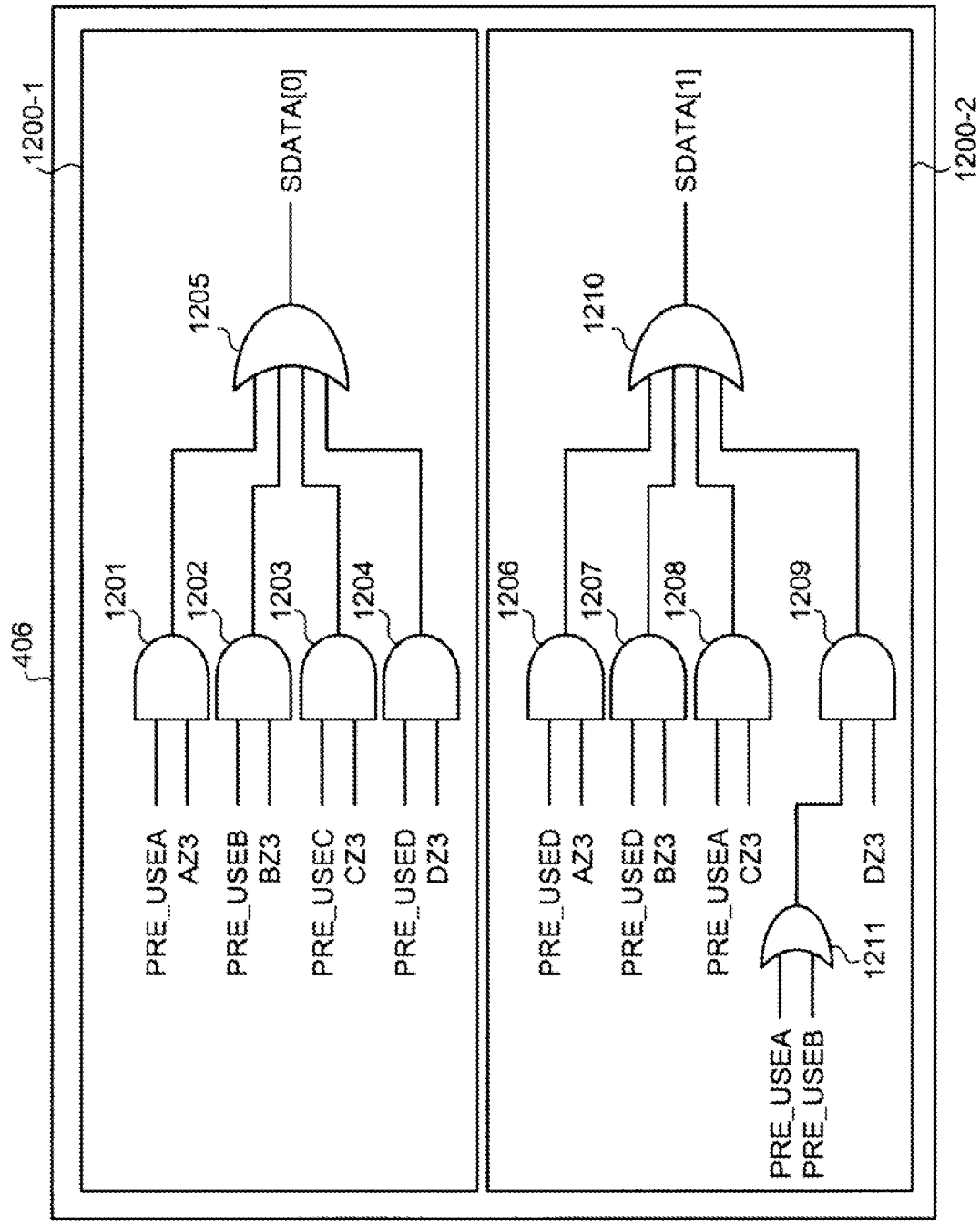
FIG. 12 is an explanatory diagram of an example of a selecting unit 406.

FIG. 12 is an explanatory diagram of an example of the selecting unit 406. The selecting unit 406 selects the transfer data from the received data based on the received data and the previous selection signals corresponding to the received data. As above, the previous selection signals are the signals PRE_USEA, PRE_USEB, PRE_USEC, and PRE_USED. The received data are values of the signals AZ3, BZ3, CZ3, and DZ3. In the example of FIG. 12, the transfer data is the value of the signal SDATA[1:0]. For example, the selecting unit 406 includes a first and a second selecting units 1200-1 and 1200-2.

The first selecting unit 1200-1 outputs the data received at the restoration timing to the serializer 312 as the signal SDATA[0]. The first selecting unit 1200-1 includes ANDs 1201 to 1204 and an OR 1205.

The signals PRE_USEA and AZ3 are input into the AND 1201. The signals PRE_USEB and BZ3 are input into the AND 1202. The signals PRE_USEC and CZ3 are input into the AND 1203. The signals PRE_USED and DZ3 are input into the AND 1204. Output signals of the ANDs 1201 to 1204 are input into the OR 1205.

The first selecting unit 1200-1: outputs the value of the signal AZ3 as the value of the signal SDATA[0]when the value of the signal PRE_USEA is "1"; outputs the value of the signal BZ3 as the value of the signal SDATA[0] when the value of the signal PRE_USEB is "1"; outputs the value of the signal CZ3 as the value of the signal SDATA[0] when the value of the signal PRE_USEC is "1"; and outputs the value of the signal DZ3 as the value of the signal SDATA[0] when the value of the signal PRE_USED is "1".

The second selecting unit 1200-2 outputs to the serializer 312 as the signal SDATA[1] the data received at the timing that does not exceed the cycle of the timings in the forward direction to the angle advancement direction from the restoration timing corresponding to the selection signal used to select the current transfer data, of the timings.

In this case, the restoration timing is the timing A or B, that corresponds to the selection signal used to select the current transfer data when a signal SDSATA[1] is set to be valid by the valid information producing unit 405. The case where the signal SDSATA[1] is set to be valid is the case where the value of the signal DVALID[1] is "1".

The timings that each do not exceed the cycle of the timings in the forward direction to the angle advancement direction from the timing A are the timings B to D.

The timing that does not exceed the cycle of the timings in the forward direction to the angle advancement direction from the timing B can be the timing D in the same clock cycle as that of this timing B.

The second selecting unit 1200-2 outputs the value of the signal CZ3 or DZ3 as the value of the signal SDATA[1] when the value of the signal PRE_USEA is "1" and outputs the value of the signal DZ3 as the value of the signal SDATA[1] when the value of the signal PRE_USED is "1". The signal DVALID[0:1] determines whether the value of the signal SDATA[1] is the data to be restored.

The second selecting unit 1200-2 includes ANDs 1206 to 1209 and ORs 1210 and 1211. The signals PRE_USED and AZ3 are input into the AND 1206. The signals PRE_USED and BZ3 are input into the AND 1207. The signals PRE_USEA and CZ3 are input into the AND 1208. The values of the signals PRE_USEA and PRE_USEB are input into the OR 1211. An output signal of the OR 1211 and the signal DZ3 are input into the AND 1209. Output signals of the ANDs 1206 to 1209 are input into the OR 1210. An output signal of the OR 1210 is the signal SDATA[1].

Figure 13:
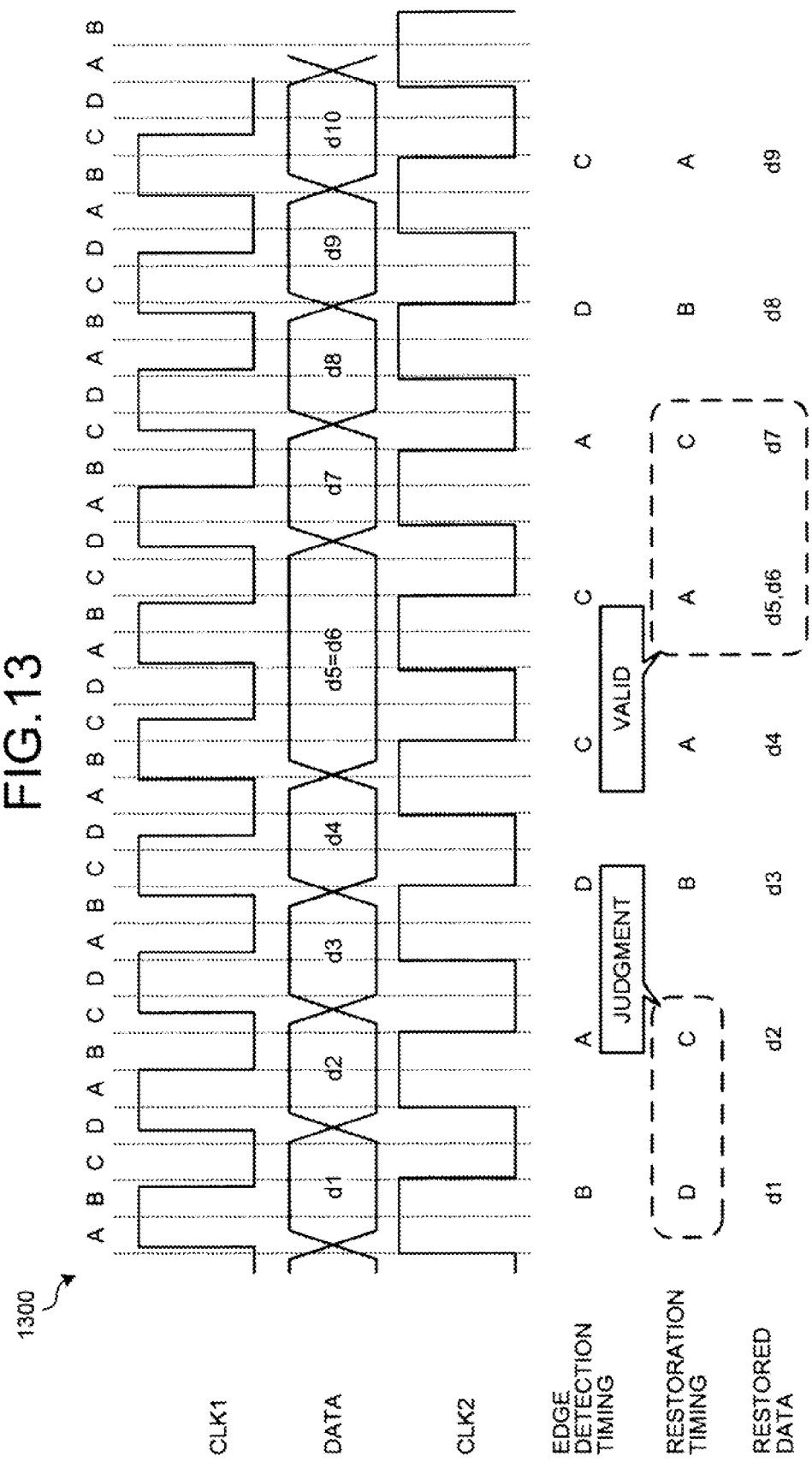
FIG. 13 is an explanatory diagram of an example of a change from a timing A to a timing C.

FIG. 13 is an explanatory diagram of an example of a change from the timing A to the timing C. A timing chart 1300 takes an example of the state where the change of the restoration timing from the timing A to the timing C is detected in the case where the transition direction of the restoration timing is the reverse direction to the angle advancement direction. For example, the judging unit 404 detects the change of the restoration timing from the timing D to the timing C and thereby, judges that the transition direction of the restoration timing is the reverse direction to the angle advancement direction. Therefore, the judging unit 404 sets the value of the signal forward_direction to be "0".

The selecting unit 406 selects the transfer data from the received data based on the received data and the previous selection signals corresponding to the received data. For example, when the value of the signal forward_direction is "0", the valid information producing unit 405 detects the change of the restoration timing from the timing A to the timing C and sets both of the values of the signals DVALID[0] and DVALID[1] to each be "1".

Thereby, when the restoration timing is changed from the timing A to the timing C, the valid information producing unit 405 sets the value of the signal DVALID[1] to be "1" and thereby, the data d6 is added to the restored data.

Figure 14:
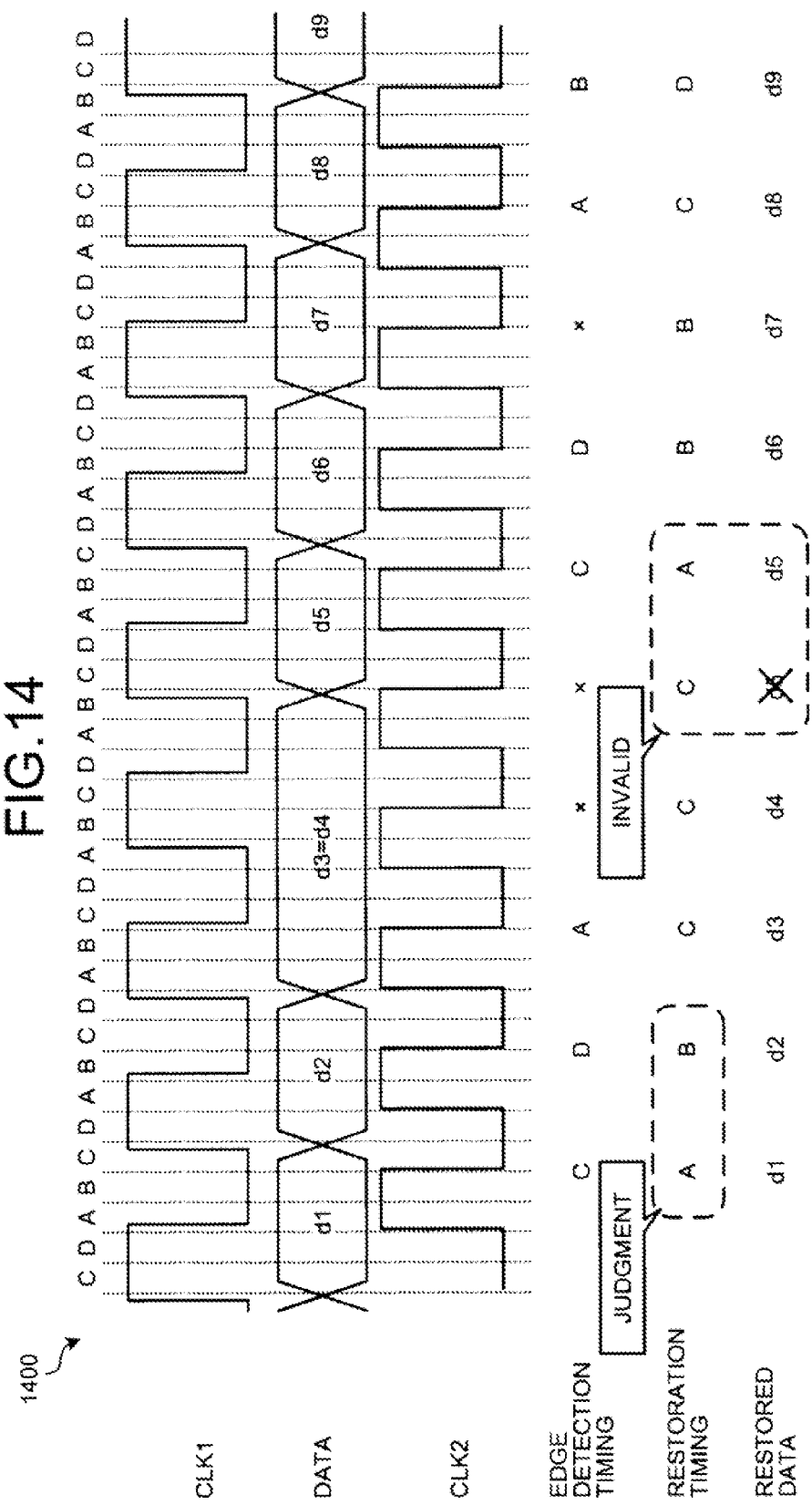
FIG. 14 is an explanatory diagram of an example of a change from the timing C to the timing A.

FIG. 14 is an explanatory diagram of an example of a change from the timing C to the timing A. A timing chart 1400 takes an example of the state where the change of the restoration timing from the timing C to the timing A is detected in the case where the transition direction of the restoration timing is the forward_direction to the angle advancement direction.

For example, the judging unit 404 detects the change from the timing A to the timing B and thereby, judges that the transition direction of the restoration timing is the forward direction to the angle advancement direction. Therefore, the judging unit 404 sets the value of the signal forward_direction to be "1".

For example, when the value of the signal forward_direction is "1", the valid information producing unit 405 detects the change of the restoration timing from the timing C to the timing A and sets both of the values of the signals DVALID[0] and DVALID[1] to each be "0".

Thereby, in the case where the value of the signal forward_direction is "1", when the change of the restoration timing from the timing C to the timing A is detected, one of duplicated data d5 is removed from the restored data.

Figure 15:
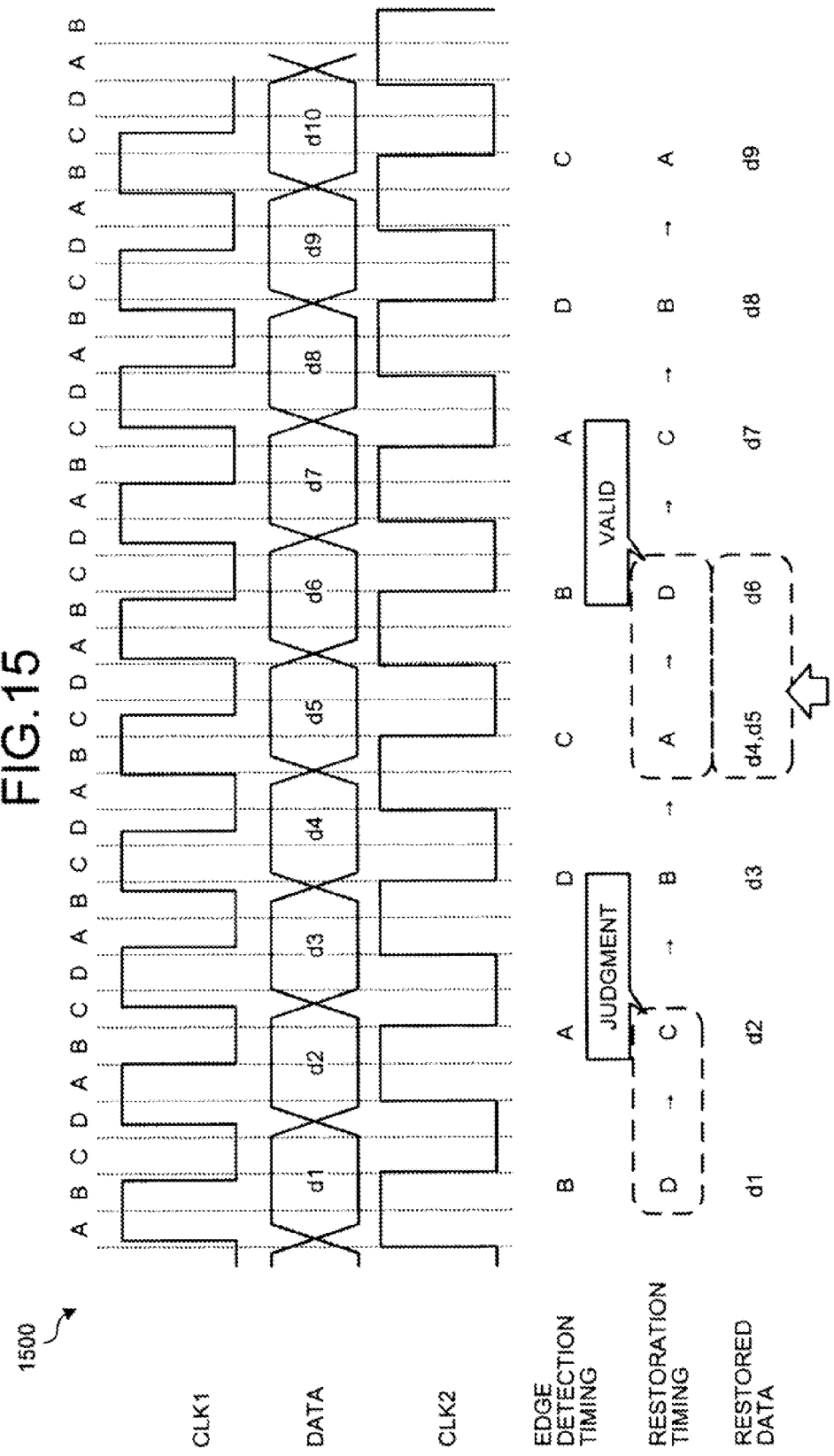
FIG. 15 is an explanatory diagram of an example of a change from the timing A to a timing D.

FIG. 15 is an explanatory diagram of an example of a change from the timing A to the timing D. A timing chart 1500 takes an example of the state where the change of the restoration timing from the timing A to the timing D is detected.

For example, the valid information producing unit 405 detects the change of the restoration timing from the timing A to the timing D and thereby, sets both of the values of the signals DVALID[0] and DVALID[1] to each be "1".

Thereby, when the restoration timing is changed from the timing A to the timing D, the data d5 is added to the restored data.

Figure 16:
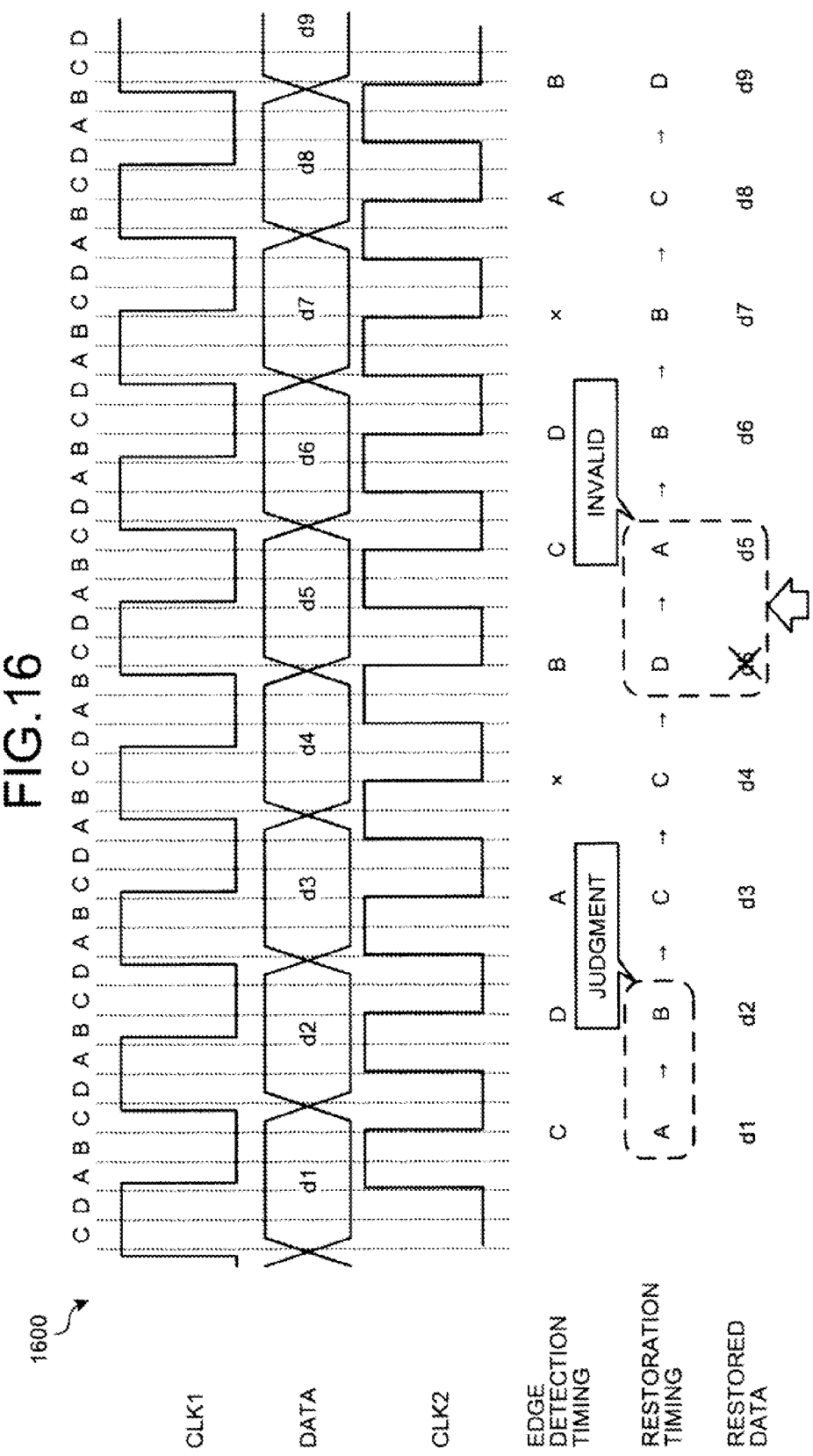
FIG. 16 is an explanatory diagram of an example of a change from the timing D to the timing A.

FIG. 16 is an explanatory diagram of an example of a change from the timing D to the timing A. A timing chart 1600 takes an example of the state where the change of the restoration timing from the timing D to the timing A is detected.

For example, the valid information producing unit 405 detects the change of the restoration timing from the timing D to the timing A and thereby, sets both of the values of the signals DVALID[0] and DVALID[1] to each be "0".

Thereby, when the restoration timing is changed from the timing A to the timing D, one of duplicated data d5 is removed from the restored data.

Figure 17:
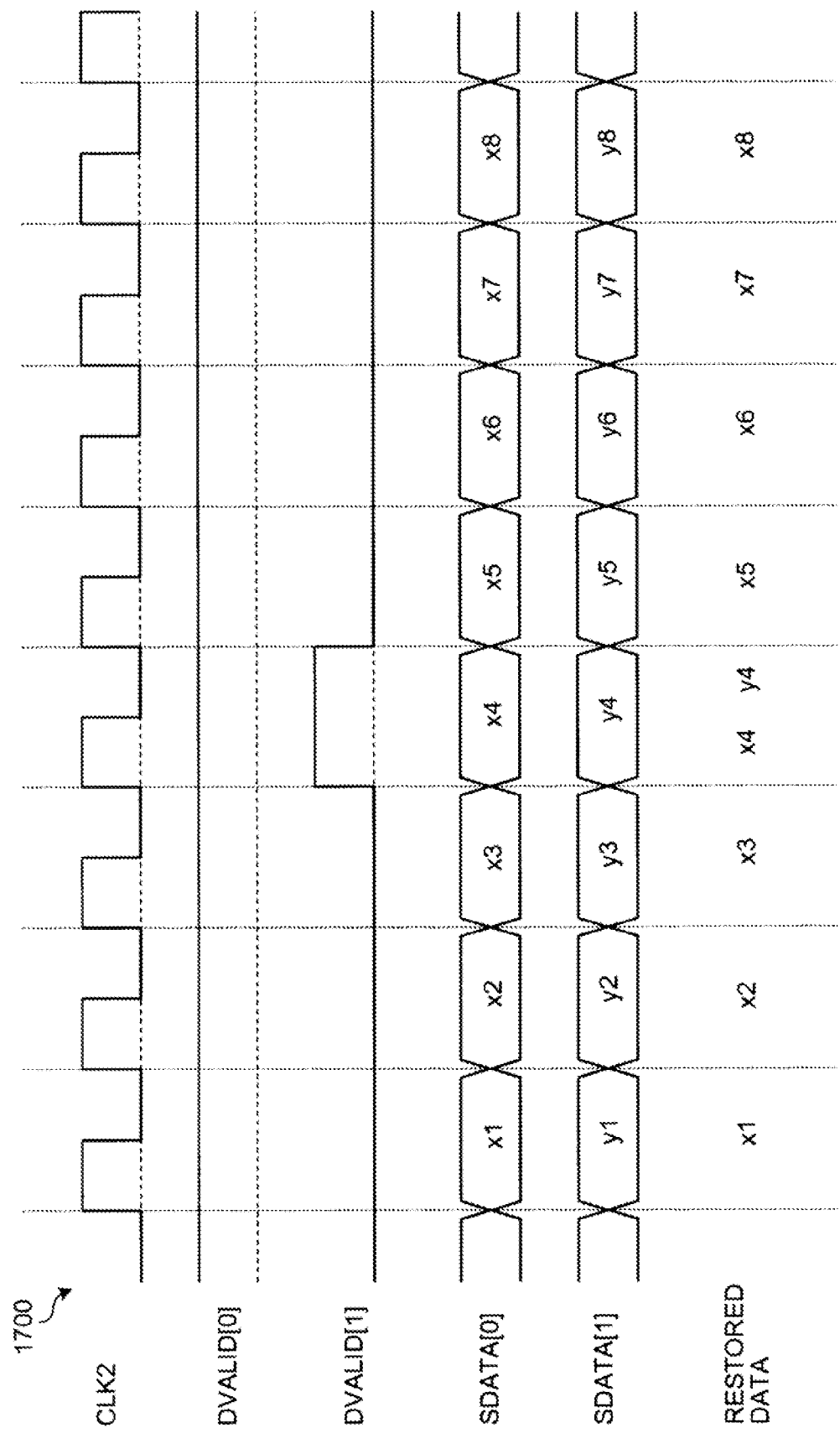
FIG. 17 is an explanatory diagram of a first example of operation executed by the deserializer 324.

FIG. 17 is an explanatory diagram of a first example of operation executed by the deserializer 324. A timing chart 1700 indicates operation executed by the deserializer 324. The timing chart 1700 indicates the signals DVALID[0], DVALID[1], SDATA[0], and SDATA[1], and restored data. When the value of the signal DVALID[0] is "1" and the value of the signal DVALID[1] is "0", the value of the signal SDATA[0] is the restored data. When the value of the signal DVALID[0] is "1" and the value of the signal DVALID[1] is "1", the values of the signals SDATA[0] and SDATA[1] are the restored data. The restored data group is {x1, x2, x3, x4, y4, x5, x6, x7, x8}.

Figure 18:
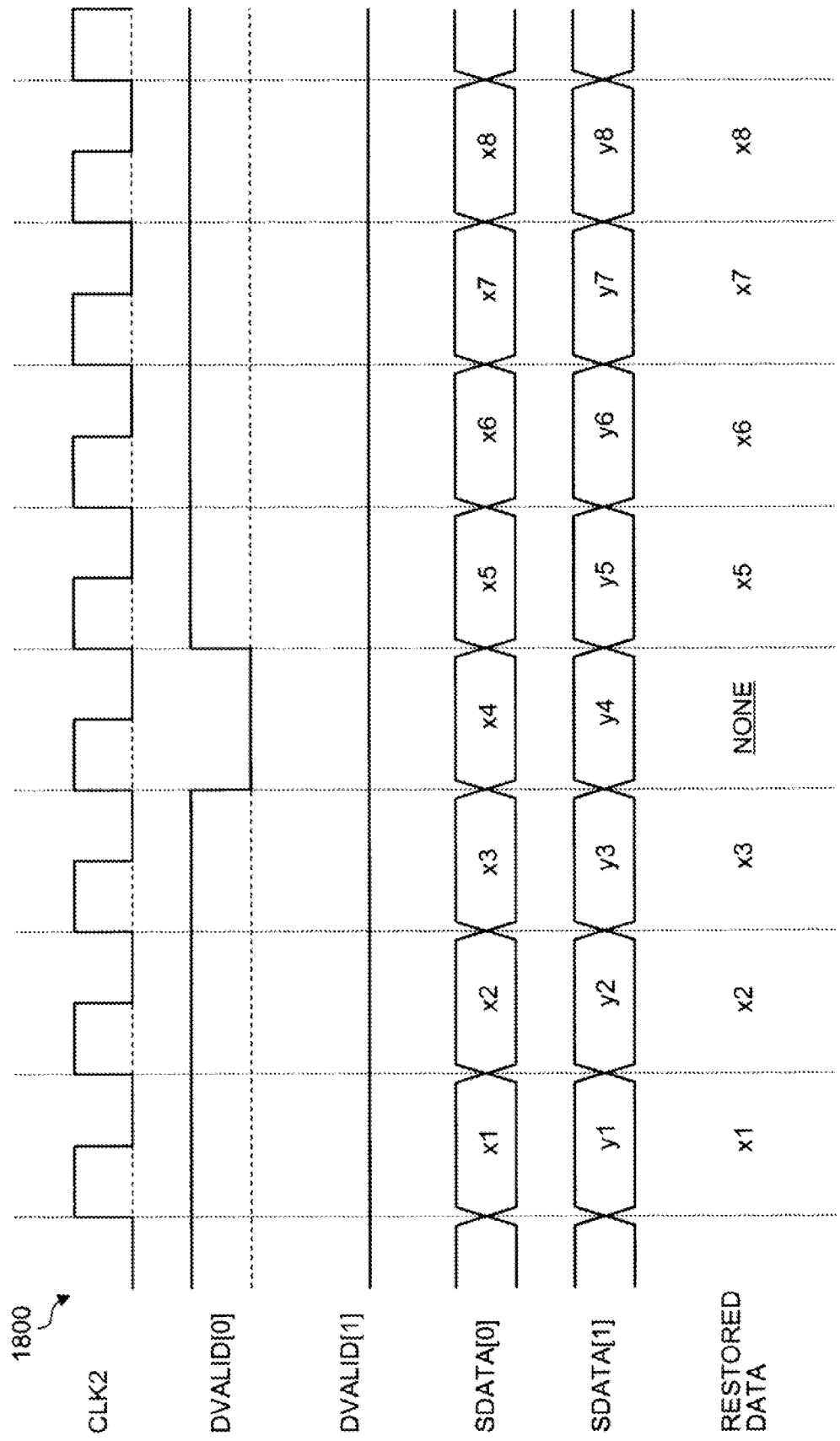
FIG. 18 is an explanatory diagram of a second example of operation executed by a deserializer 324.

FIG. 18 is an explanatory diagram of a second example of operation executed by the deserializer 324. A timing chart 1800 indicates operation executed by the deserializer 324. The timing chart 1800 indicates the signals DVALID[0], DVALID[1], SDATA[0], and SDATA[1], and restored data. When the value of the signal DVALID[0] is "1" and the value of the signal DVALID[1] is "0", the value of the signal SDATA[0] is the restored data. When the value of the signal DVALID[0] is "0" and the value of the signal DVALID[1] is "0", no restored data is present. Therefore, the restored data group is {x1, x2, x3, x5, x7, x8}. In the timing chart, x4 is not the restored data, that is the value of the signal SDATA[0] acquired when the value of the signal DVALID[0] is "0" and the value of the signal DVALID[1] is "0". As above, x4 is the data same as x5 and therefore, the data recovering unit 323 determines that the value of the signal DVALID[0] is "0" and the value of the signal DVALID[1] is "0".

It is assumed that no change occurs to the data transmitted from the transmitting apparatus 301, and the number of cycles is denoted by "n" of the signal CLK1 that is the longest one including consecutive "0" or "1" and the ratio of a shift of the frequency of the transmission clock against the reception clock (clock margin) is denoted by m. Loss of data and multiple reception sessions of the same data occur more frequently as the clock margin is larger. The condition for the number of cycles "n" and the clock margin "m" are expressed in Equation (1) below.

$$n \times m < 25 = 100[\%]/4(\text{the number of timings}) \quad (1)$$

For example, when the number of cycle n is eight, the clock margin m is acquired as below.

$$m = 25/8 \approx 3.1[\%]$$

It is the premise for the receiving apparatus 302 according to the present invention that two or more timings are not skipped even when the change of the restoration timing is discrete. Therefore, the receiving apparatus 302 is able to restore even when the change of the restoration timing skips one timing. Therefore, the condition for the number of cycles n and the clock margin m of the receiving apparatus 302 is expressed in Equation (2) below.

$$n \times m < 50 = 100[\%]/2 \quad (2)$$

Therefore, when n is n=8, the condition is expressed in Equation (3) below.

$$m = 50/8 \approx 6.2 \quad (3)$$

Therefore, according to the receiving apparatus 302, the clock margin is permissive that is about two times as large as the clock margin of the case where the data is not able to be restored when the change of the restoration timing is not discrete. Therefore, according to the receiving apparatus 302, the accuracy in restoring the data is able to be improved.

In the above, various changes are able to be made to the present invention not limiting to the above embodiment. For example, it is the premise that two or more timings are not skipped even when the change of the restoration timing is discrete. However, not limiting to this, the valid information producing unit 405 may skip two or more timings. For example, though the number of timings is four, the number of timings may be larger. A detailed example of the judging unit 404 and the valid information producing unit 405 for the number of timings that is N will be described with reference to FIGS. 19 and 20.

Figure 19:
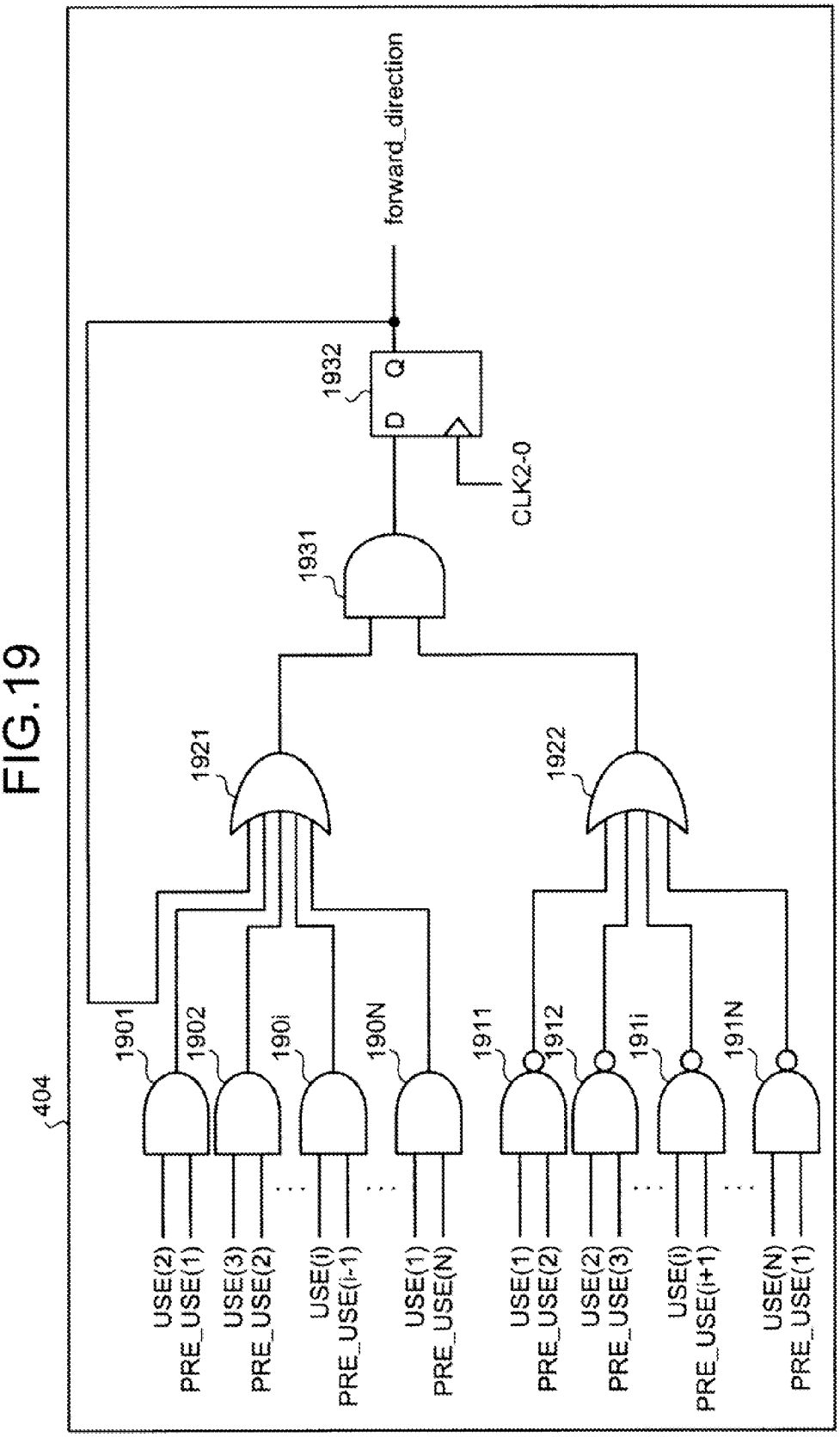
FIG. 19 is an explanatory diagram of an example of the judging unit 404 for the number of timings that is N.

FIG. 19 is an explanatory diagram of an example of the judging unit 404 for the number of timings that is N. The judging unit 404 detects consecutive changes of the timings and thereby, determines whether the transition direction of the restoration timing is the forward or the reverse direction to the angle advancement direction. When the value of the signal forward_direction is "0", this indicates that the transition direction of the restoration timing is the reverse direction to the angle advancement direction. When the value of the signal forward_direction is "1", this indicates that the transition direction of the restoration timing is the forward direction to the angle advancement direction.

The judging unit 404 includes ANDs 1901 to 190N and 1931, NANDs 1911 to 191N, ORs 1921 and 1922, and an FF 1932. For example, the judging unit 404 detects that the transition direction of the restoration timing is the forward direction to the angle advancement direction, using the ANDs 1901 to 190N and the OR 1921. Taking an example of the AND 190i (i≥2), signals USE(i) and PRE_USE(i−1) are input into the AND 190i, and an output signal of the AND 190i is input into the OR 1921.

The judging unit 404 detects that the transition direction of the restoration timing is the reverse direction to the angle advancement direction, using the NANDs 1911 to 191N and the OR 1922. Taking an example of the NAND 191i (i≥2), signals USE(i) and PRE_USE(i+1) are input into the NAND 191i, and an output signal of the NAND 191i is input into the OR 1922.

Output signals of the ANDs 1901 to 190N are input into the OR 1921. Output signals of the NANDs 1911 to 191N are input into the OR 1922. Output signals of the ORs 1921 and 1922 are input into the AND 1931.

An output signal of the AND 1931 is input into the FF 1932 as a data signal and the signal CLK2-0 is input thereinto as a clock signal. An output signal of the FF 1932 is the signal forward_direction.

Figure 20:
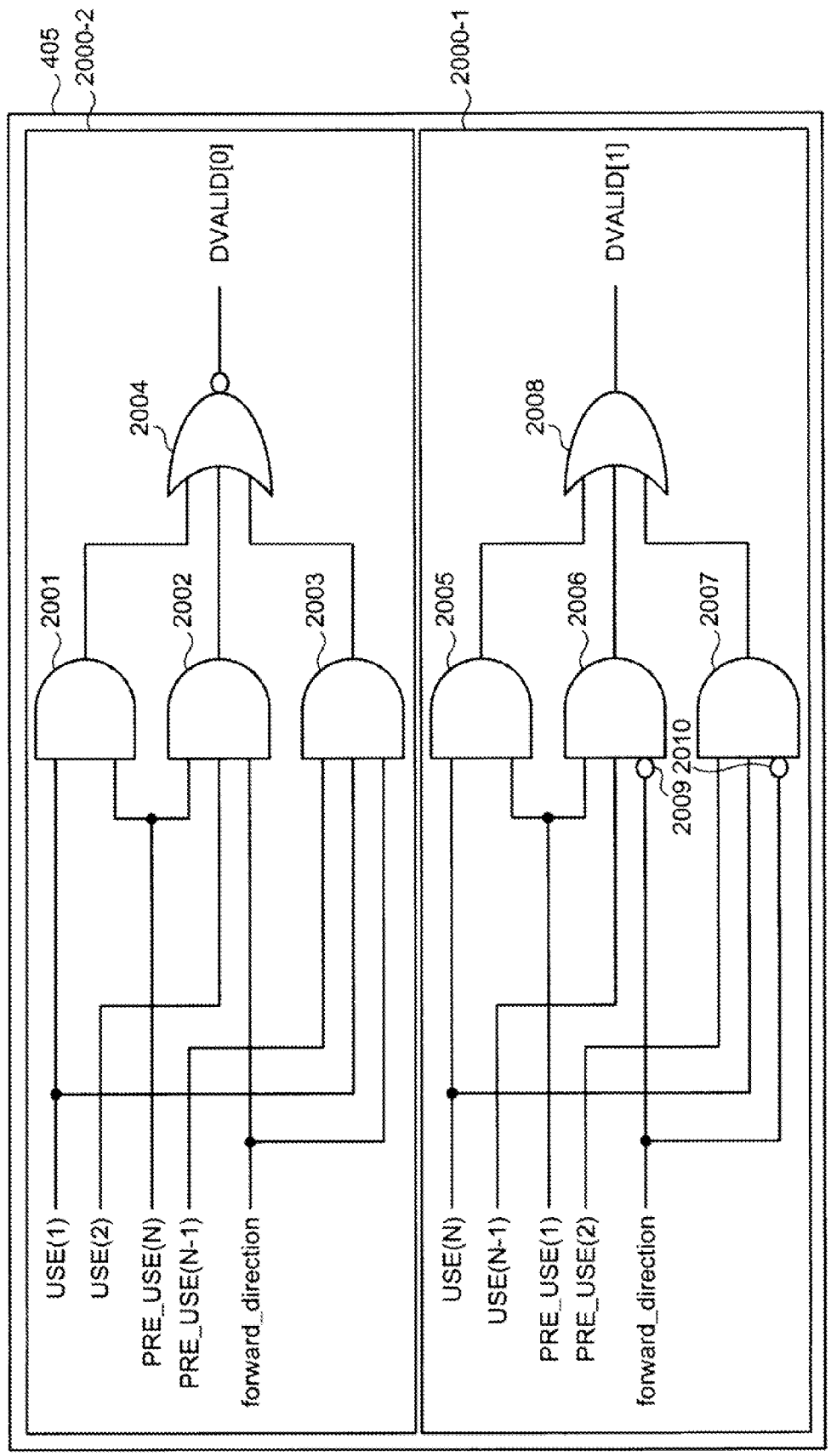
FIG. 20 is an explanatory diagram of an example of the valid information producing unit 405 for the number of timings that is N.

FIG. 20 is an explanatory diagram of an example of the valid information producing unit 405 for the number of timings that is N. The valid information producing unit 405 determines the values of the signals DVALID[0] and DVALID[1]. In this case, it is the premise that the change of the timing does not take place skipping two or more timings even when the number of timings is N.

The valid information producing unit 405 includes a first and a second valid information producing units 2000-1 and 2000-2. The first valid information producing unit 2000-1 includes ANDs 2005 to 2007, an OR 2008, and INVERTERs 2009 and 2010.

The signals USE(N) and PRE_USE(1) are input into the AND 2005. The signal forward_direction is input into the INVERTERs 2009 and 2010. The signals USE(N−1) and PRE_USE(1) and an output signal of the INVERTER 209 are input into the AND 2006. The signals USE(N) and PRE_USE(2) and an output signal of the INVERTER 2010 are input into the AND 2007. Output signals of the ANDs 2005 to 2007 are input into the OR 2008. An output signal of the OR 2008 is the signal DVALID[1].

In the case where the value of the signal forward_direction is "0", when the value of the signal PRE_USE(1) is "1" and the value of the signal USE(N−1) is "1", the first valid information producing unit 2000-1 sets the value of the signal DVALID[1] to be "1". Otherwise, in the case where the value of the signal forward_direction is "0", when the value of the signal PRE_USE(2) is "1" and the value of the signal USE(N) is "1", the first valid information producing unit 2000-1 sets the value of the signal DVALID[1] to be "1". Otherwise, when the value of the signal PRE_USE(1) is "1" and the value of the signal USE(N) is "1", the first valid information producing unit 2000-1 sets the value of the signal DVALID[1] to be "1".

The second valid information producing unit 2000-2 includes ANDs 2001 to 2003 and a NOR 2004. The signals PRE_USE(N) and USE(1) are input into the AND 2001. The signals forward_direction, PRE_USE(N), and USE(2) are input into the AND 2002. The signals forward_direction, PRE_USE(N−1), and USE(1) are input into the AND 2003.

Output signals of ANDs 2001 to 2003 are input into the NOR 2004. An output signal of the NOR 2004 is the signal DVALID[0].

In the case where the value of the signal forward_direction is "1", when the value of the signal PRE_USE(N−1) is "1" and the value of the signal USE(1) is "1", the second valid information producing unit 2000-2 sets the value of the signal DVALID[0] to be "0". Otherwise, in the case where the value of the signal forward_direction is "1", when the value of the signal PRE_USE(N) is "1" and the value of the signal USE(2) is "1", the second valid information producing unit 2000-2 sets the value of the signal DVALID[0] to be "0". Otherwise, when the value of the signal PRE_USE(N) is "1" and the value of the signal USE(1) is "1", the second valid information producing unit 2000-2 sets the value of the signal DVALID[0] to be "0".

As described, the receiving apparatus determines whether the transition direction of the restoration timing is the reverse direction to the angle advancement direction, and determines whether the transfer data is made valid, that is selected from the received data based on the previous selection signal, according to the result of the above determination, the result of the determination as to whether the time period of the change of the restoration timing spans two cycles of the reception clock. Thereby, even when it is unknown in advance which one of the frequencies of the reception clock and the transmission clock is higher than the other, loss of restored data is prevented that occurs because the frequency of the transmission clock is higher than that of the reception clock. Even when it is unknown in advance which one of the frequencies of the reception clock and the transmission clock is higher than the other, duplication of the restored data is prevented that occurs because the frequency of the reception clock is higher than that of the transmission clock. Therefore, restoration accuracy is able to be improved.

When the transition direction of the restoration timing is the reverse direction to the angle advancement direction, the frequency of the transmission clock is higher than that of the reception clock. Therefore, when the time period of the change of the restoration timing spans two cycles of the reception clock, the restored data is lost and therefore, the receiving apparatus adds to the data to be restored the data received at the restoration timing that is less than one cycle following the order of generation of the timings, from the restoration timing before the change. Thereby, the data is to be restored, that is skipped when the time period spans the two cycles and therefore, the loss of the restored data is able to be prevented. Therefore, the restoration accuracy is able to be improved.

When the transition direction of the restoration timing is the forward direction to the angle advancement direction, the frequency of the transmission clock of the receiving apparatus is lower than that of the receiving clock thereof. Therefore, when the time period of the change of the restoration timing spans two cycles, the same data is doubly determined as the data to be restored. Therefore, the data is to be restored, that remains after excluding the data received at one restoration timing before or after the change from the data group received at the restoration timing. Thereby, the same data is able to be prevented from being doubly determined as the data to be restored. Therefore, the restoration accuracy is able to be improved.

In the case where the changes of the restoration timing are consecutive, when the time period of the change of the restoration timing exceeds the cycle of the timings, the receiving apparatus produces the valid information of any one of the selected transfer data, as a true value. Thereby, the receiving apparatus is able to prevent loss and duplication of the restored data.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A receiving apparatus connected to a transmission apparatus that transmits data, comprising:
   a clock generating unit that generates a clock signal at a predetermined frequency;
   a clock angle-advancing unit that generates a plurality of angle-advanced clock signals including the clock signal generated by the clock generating unit and a plurality of clock signals corresponding to a plurality of timings and generated by angle-advancing the clock signal by predetermined phases;
   a receiving unit that uses the angle-advanced clock signals to receive at the plurality of timings, the data transmitted by the transmitting apparatus;
   a detecting unit that detects each rising edge of each of the received data received by the receiving unit, and each falling edge of each of the received data received by the receiving unit;

a determining unit that based on the detected rising edge of each of the received data and the detected falling edge of the received data, produces a plurality of selection signals that each determine, among the plurality of timings, a restoration timing to restore the data, and a plurality of previous selection signals retaining the selection signals;

a judging unit that judges a transition direction of the restoration timing among the plurality of timings, based on the selection signals and the previous selection signals;

a selecting unit that selects transfer data from among the received data, based on the received data and the previous selection signals corresponding to the received data; and a valid information producing unit that produces valid information of the transfer data selected by the selecting unit, based on the selection signals, the previous selection signals, and the transition direction of the restoration tinning judged by the judging unit.

2. The receiving apparatus according to claim 1, wherein the valid information producing unit produces the valid information of the transfer data selected by the selecting unit based on the transition direction of the restoration tinning and based on whether a time period between a restoration timing among the plurality of timings and corresponding to the previous selection signal used by the selecting unit to select previous transfer data and the restoration timing among the plurality of timings and corresponding to the selection signal used by the selecting unit to select current transfer data, exceeds a cycle of the plurality of timings.

3. The receiving apparatus according to claim 2, wherein the valid information producing unit produces all of the valid information of the transfer data selected by the selecting unit as false values when the transition direction of the restoration timing is a forward direction to an angle advancement direction and the time period between the restoration timing corresponding to the previous selection signal used by the selecting unit to select the previous transfer data and the restoration timing corresponding to the selection signal used by the selecting unit to select the current transfer data exceeds the cycle of the plurality of timings.

4. The receiving apparatus according to claim 2, wherein the valid information producing unit produces all of the valid information of the transfer data selected by the selecting unit as true values when the transition direction of the restoration tinning is a reverse direction to an angle advancement direction and the time period between the restoration timing corresponding to the previous selection signal used by the selecting unit to select the previous transfer data and the restoration timing corresponding to the selection signal used by the selecting unit to select the current transfer data exceeds cycle of the plurality of timings.

5. The receiving apparatus according to claim 2, wherein the valid information producing unit produces the valid information of any one of the transfer data selected by the selecting unit as a true value when the time period between the restoration timing corresponding to the previous selection signal used by the selecting unit to select the previous transfer data and the restoration timing corresponding to the selection signal used by the selecting unit to select the current transfer data exceeds the cycle of the plurality of timings.

6. A transmission and reception system comprising a transmitting apparatus that transmits data, and a receiving apparatus that is connected to the transmitting apparatus, wherein the transmitting apparatus includes:

a first clock generating unit that generates a first clock signal at a first predetermined frequency; and a transmitting unit that transmits the data based on the first clock signal generated by the first clock generating unit, wherein the receiving apparatus includes:

a second clock generating unit that generates a second clock signal at a second predetermined frequency;

a second clock angle-advancing unit that generates a plurality of second angle-advancement clock signals including the second clock signal generated by the second clock generating unit and a plurality of clock signals corresponding to a plurality of timings and generated by angle-advancing the second clock signal by predetermined phases;

a receiving unit that uses the second angle-advancement clock signals to receive the data at the plurality of timings;

a detecting unit that detects each rising edge of each of the received data received by the receiving unit, and each falling edge of each of the received data received by the receiving unit;

a determining unit that based on the detected rising edge of each of the received data and the detected falling edge of the received data, produces a plurality of selection signals that each determine, among the plurality of timings, a restoration timing to restore the data, and a plurality of previous selection signals retaining the selection signals;

a judging unit that judges a transition direction of the restoration timing among the plurality of timings, based on the selection signals and the previous selection signals;

a selecting unit that selects transfer data from the received data, based on the received data and the previous selection signals corresponding to the received data; and a valid information producing unit that produces valid information of the transfer data selected by the selecting unit, based on the selection signals, the previous selection signals, and the transition direction of the restoration tinning judged by the judging unit.

7. A control method executed by a transmission and reception system comprising a transmitting apparatus that transmits data, and a receiving apparatus that is connected to the transmitting apparatus, the control method comprising:

generating, by a first clock generating unit constituting the transmitting apparatus, a first clock signal at a first predetermined frequency;

transmitting, by a transmitting unit constituting the transmitting apparatus, the data based on the first clock signal generated by the first clock generating unit;

generating, by a second clock generating unit constituting the receiving apparatus, a second clock signal at a second predetermined frequency;

generating, by a second clock angle-advancing unit constituting the receiving apparatus, a plurality of second angle-advancement clock signals including the second clock signal generated by the second clock generating unit and a plurality of clock signals corresponding to a plurality of timings and generated by angle-advancing the second clock signal by predetermined phases;

receiving, by a receiving unit constituting the receiving apparatus, the data at the plurality of timings by using the second angle-advancement clock signals;

detecting, by a detecting unit constituting the receiving apparatus, each rising edge of each the received data received by the receiving unit and each falling edge of each of the received data received by the receiving unit;

producing, by a determining unit constituting the receiving apparatus and based on the detected rising edge of each of the received data and the detected falling edge of the received data, a plurality of selection signals that each determine, among the plurality of timings, a restoration timing to restore the data, and a plurality of previous selection signals retaining the selection signals;

judging, by a judging unit constituting the receiving apparatus, a transition direction of the restoration timing among the plurality of timings, based on the selection signals and the previous selection signals;

selecting, by a selecting unit constituting the receiving apparatus, the transfer data from the received data based on the received data and the previous selection signals corresponding to the received data; and producing, by a valid information producing unit constituting the receiving apparatus, valid information of the transfer data selected by the selecting unit, based on the selection signals, the previous selection signals, and the transition direction of the restoration timing judged by the judging unit.

* * * * *